(12) United States Patent
Krake et al.

(10) Patent No.: US 10,945,540 B2
(45) Date of Patent: Mar. 16, 2021

(54) HANGER BRACKET FOR USE WITH PICTURE FRAMES

(71) Applicant: UNDER THE ROOF DECORATING INC., Calgary (CA)

(72) Inventors: Kelly Krake, Calgary (CA); Liette Tousignant, Calgary (CA); Michael Kurtz, Calgary (CA)

(73) Assignee: UNDER THE ROOF DECORATING INC., Calgary (CA)

( * ) Notice: Subject to any disclaimer, the term of this patent is extended or adjusted under 35 U.S.C. 154(b) by 0 days.

(21) Appl. No.: 16/798,591

(22) Filed: Feb. 24, 2020

(65) Prior Publication Data

US 2020/0187681 A1 Jun. 18, 2020

Related U.S. Application Data

(63) Continuation-in-part of application No. 15/714,272, filed on Sep. 25, 2017, now Pat. No. 10,575,663, which is a continuation-in-part of application No. 15/185,889, filed on Jun. 17, 2016, now Pat. No. 10,098,483, which is a continuation-in-part of application No. 14/960,980, filed on Dec. 7, 2015, now Pat. No. 9,826,845, which is a continuation-in-part of application No. 14/842,128, filed on Sep. 1, 2015, now Pat. No. 9,839,307, which is a continuation-in-part of application No.
(Continued)

(51) Int. Cl.
*A47G 1/16* (2006.01)
*F16M 13/02* (2006.01)
*A47G 1/22* (2006.01)

(52) U.S. Cl.
CPC ............. *A47G 1/1633* (2013.01); *A47G 1/22* (2013.01); *F16M 13/02* (2013.01)

(58) Field of Classification Search
CPC ......... A47G 1/1633; A47G 1/22; F16M 13/02
See application file for complete search history.

(56) References Cited

U.S. PATENT DOCUMENTS

| | | |
|---|---|---|
| 1,159,813 A | 11/1915 | Volkhardt |
| 1,340,711 A | 5/1920 | Greenwald |
| 1,407,177 A | 2/1922 | Stone |

(Continued)

FOREIGN PATENT DOCUMENTS

| | | |
|---|---|---|
| FR | 2674736 | 10/1992 |
| FR | 2835167 | 8/2003 |

(Continued)

*Primary Examiner* — Anita M King
(74) *Attorney, Agent, or Firm* — Norton Rose Fulbright Canada LLP; Alexandre Daoust

(57) ABSTRACT

A bracket for hanging a picture frame on a supporting structure. The bracket is a one-piece member formed of plastic having a pair of legs projecting perpendicularly from a bottom surface of a base and extending at right angles with respect to each other. The legs are spaced from a peripheral edge of the base forming a V-shaped planar portion between the edge and legs. A reinforcing member extends between the pair of legs and an attachment pin mounted in the reinforcing member extends outwardly beyond a top surface of the base. A pair of attachment pins is pressed into the supporting structure to suspend the frame therefrom after two of the brackets are secured in upper right hand corners of the frame.

17 Claims, 25 Drawing Sheets

Related U.S. Application Data

14/842,024, filed on Sep. 1, 2015, now Pat. No. 9,801,477.

(56) References Cited

U.S. PATENT DOCUMENTS

| | | | |
|---|---|---|---|
| 1,496,282 | A | 6/1924 | Taylor |
| 1,633,859 | A | 6/1927 | Harvey |
| 2,010,660 | A | 8/1935 | Ferris |
| 2,204,862 | A | 6/1940 | Lehman |
| 2,639,109 | A | 5/1953 | Hoag |
| 3,265,339 | A | 8/1966 | Hushek |
| 3,514,886 | A | 6/1970 | Drakard |
| 3,529,799 | A | 9/1970 | Schaefer |
| 3,692,265 | A | 9/1972 | Barriger |
| 3,787,937 | A | 1/1974 | Gross |
| 3,861,639 | A | 1/1975 | Morrill |
| 4,040,149 | A | 8/1977 | Einhom |
| 4,179,089 | A | 12/1979 | Parr, Jr. |
| 4,348,826 | A | 9/1982 | Reim |
| 4,437,639 | A | 3/1984 | Stein |
| 4,458,873 | A | 7/1984 | Sutherland |
| 4,568,055 | A | 2/1986 | Klitzky |
| 4,606,526 | A | 8/1986 | Rabinowitz |
| 4,689,906 | A | 9/1987 | Sherman |
| 4,809,859 | A | 3/1989 | Chung |
| D303,942 | S | 10/1989 | Bottcher |
| 5,189,820 | A | 3/1993 | Komamura |
| 5,199,681 | A | 4/1993 | Reidy |
| 5,249,765 | A | 10/1993 | Garcia |
| 5,255,458 | A | 10/1993 | Piel |
| 5,265,358 | A | 11/1993 | Borod |
| 5,279,056 | A | 1/1994 | Komamura |
| 5,303,895 | A | 4/1994 | Hart |
| 5,464,185 | A | 11/1995 | Hensley |
| 5,799,429 | A | 9/1998 | Speshyock |
| 5,947,437 | A | 9/1999 | Tate et al. |
| 6,042,078 | A | 3/2000 | Donovan |
| 6,439,520 | B1 | 8/2002 | Johnson |
| 6,682,033 | B1 | 1/2004 | Cohen et al. |
| 6,719,260 | B1 | 4/2004 | Hart |
| 6,729,060 | B1 | 5/2004 | Rietkerk |
| 7,313,880 | B2 | 1/2008 | Yamagishi |
| D572,122 | S | 7/2008 | Cave |
| 8,104,208 | B2 | 1/2012 | Schymura |
| 8,342,472 | B2 | 1/2013 | Gaudron et al. |
| 8,632,044 | B2 | 1/2014 | Cave |
| 8,740,171 | B2 | 6/2014 | Crescenzo |
| 8,793,910 | B2 | 8/2014 | Froio et al. |
| 8,898,945 | B2 | 12/2014 | Miller |
| RE45,475 | E | 4/2015 | Schymura |
| 9,259,105 | B2 | 2/2016 | Van Bortel |
| D753,465 | S | 4/2016 | Marsh |
| 10,098,483 | B2 * | 10/2018 | Krake ............ A47G 1/1633 |
| 2005/0006552 | A1 | 1/2005 | Giles |
| 2007/0210234 | A1 | 9/2007 | Lin |
| 2009/0064555 | A1 | 3/2009 | Schymura |
| 2009/0113776 | A1 | 5/2009 | Van Bortel |
| 2009/0193674 | A1 | 8/2009 | Megahed |
| 2009/0294610 | A1 | 12/2009 | Paharik et al. |
| 2012/0036754 | A1 | 2/2012 | Van Bortel |
| 2014/0173923 | A1 | 6/2014 | Van Bortel |
| 2017/0055730 | A1 | 3/2017 | Krake et al. |
| 2017/0055732 | A1 | 3/2017 | Krake et al. |
| 2017/0059084 | A1 | 3/2017 | Krake et al. |

FOREIGN PATENT DOCUMENTS

| | | |
|---|---|---|
| GB | 1031208 | 6/1966 |
| JP | 3872881 | 1/2007 |
| JP | 2015203780 | 11/2015 |
| KR | 100541232 | 1/2006 |
| KR | 20130035592 | 4/2013 |
| WO | 8504789 | 11/1985 |

* cited by examiner

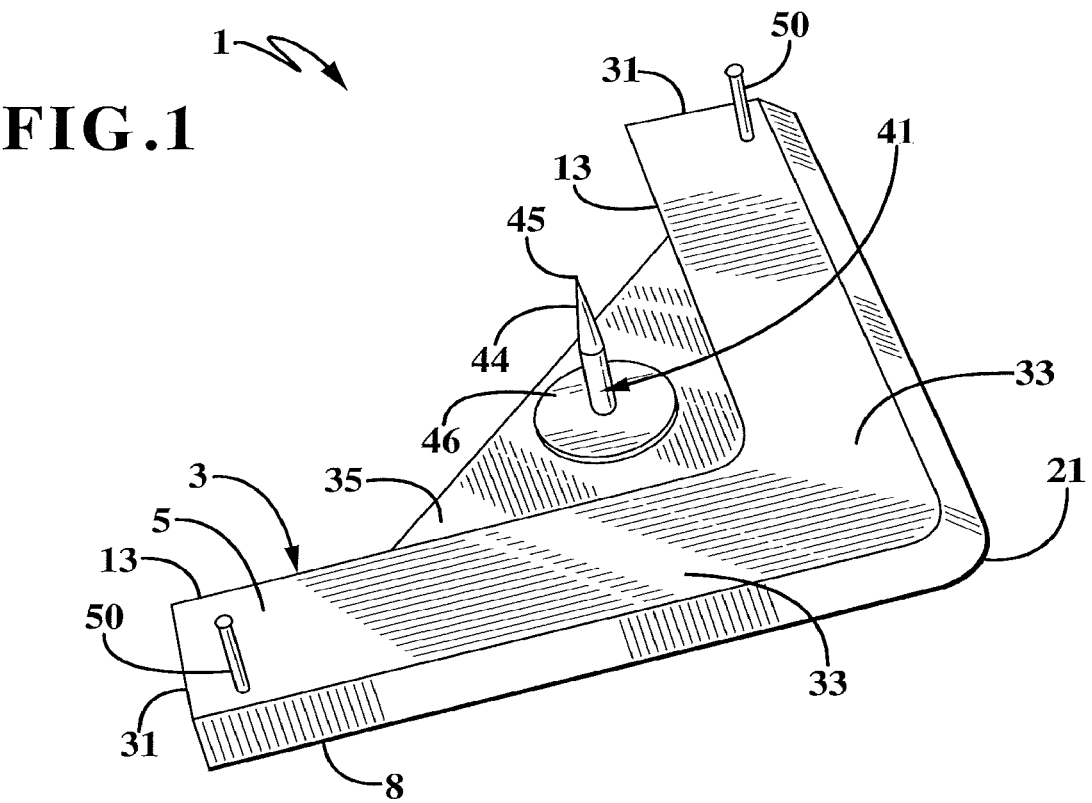
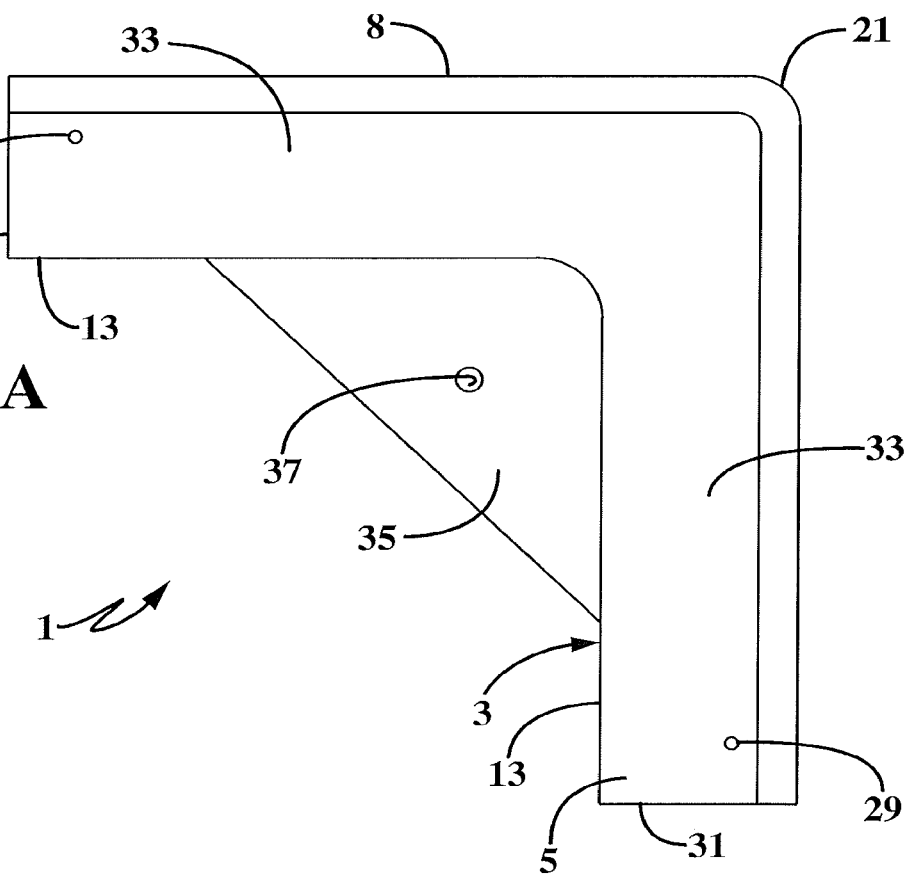

HANGER BRACKET FOR USE WITH PICTURE FRAMES

CROSS-REFERENCE TO RELATED APPLICATIONS

This application is a Continuation-in-Part of U.S. patent application Ser. No. 15/714,272, filed Sep. 25, 2017, which application is a Continuation-in-Part of U.S. patent application Ser. No. 15/185,889, filed Jun. 17, 2016, which application is a Continuation-in-Part of U.S. patent application Ser. No. 14/960,980, filed Dec. 7, 2015, which application is a Continuation-in-Part of U.S. patent application Ser. No. 14/842,128, filed Sep. 1, 2015 and a Continuation-in-Part of U.S. patent application Ser. No. 14/842,024, filed Sep. 1, 2015; the entire specifications of which are incorporated herein by reference.

FIELD

The invention relates to a bracket for hanging objects such as picture frames, mirrors, etc. onto a supporting wall or structure. More particularly, the invention relates to a bracket and method of use for supporting a wall hanging wherein the hanger is easily and quickly mounted on the picture frame and which has a protruding pin for insertion into the supporting structure for attaching the frame to the structure.

BACKGROUND

Canvas art typically comes without an external frame in contrast to most pictures and art work which come in a frame. The canvas is stretched and stapled or glued to an internal frame usually made of wood. The size of the canvas can vary greatly but the height of the frame (i.e. the distance from the wall to the attached canvas) has several standard sizes.

There is currently a limited number of options available to hang canvas art attached to these internal frames. One is to hang the wooden frame on one or more exposed nails secured in the wall. The problem with this is that it doesn't secure the canvas and frame to the wall so it can fall off if bumped. Another option requires the installation of additional hardware on the frame. The hardware could be picture wire, D-ring hangers, a sawtooth hanger, etc. This hardware will keep the canvas on the wall more securely but prevents the frame from being flush against the wall. Also, such prior art hanging hardware is difficult to install accurately on the frame and accurate placement on the supporting structure is difficult.

Many picture frames today are formed with a channel on three or four sides of the frame along the interior at the rear of the frame. This channel is used to receive either the outer protective glass, matting frame, picture, and/or backing plate or the toggle locking clip mounted on the bottom of the backing plate. In many picture frames, this internal groove goes unused.

Therefore the need exists for a bracket which can securely attach various types of objects such as framed members, mirrors, clocks, wall art, etc. in a substantially flush manner to a support structure with less hardware and more accurately on the structure by combining the functional characteristics of traditional hardware fixed to the frame or mounted thereon without requiring numerous hardware components attached to the frame, and which can utilize the internal channel present on many frames to eliminate the necessity of attaching the bracket to the frame with additional fasteners.

SUMMARY

In one aspect, the invention may provide a bracket for mounting an object on a support structure, said bracket comprising: a base having first and second surfaces terminating in a peripheral edge; a pair of legs projecting perpendicularly from the first surface and extending at right angles with respect to each other, each of said legs being spaced from the peripheral edge of the base forming a planar portion therebetween on said first surface; at least one fastener engageable with the planar portion of the base for securing the bracket to the object; and an attachment pin extending outwardly beyond the second surface for attaching the object to the support structure.

In another aspect, the invention may provide in combination, a rectangular frame and a pair of spaced corner brackets for hanging said frame on a support structure; said frame having at least a top frame member and two side frame members forming at least two right angled corners, each of said frame members having a front surface, a rear surface and opposed inner and outer side surfaces; a sheet of material extending across the front surfaces of the frame members; each of said brackets comprising a base having spaced first and second surfaces terminating in an outer edge; a pair of spaced legs extending perpendicularly from the second surface of the base and forming a right angle therebetween, at least one of said legs being spaced from the outer edge of the base forming a planar shelf on the second surface of the base and engageable with the top frame member to support the frame thereon, with the other of said legs engageable with a respective side frame member to position each of said brackets in one of the right angle corners; at least one fastener extending from the second surface of the base and engageable with one of the rear surfaces of the frame members to secure the bracket on the frame; and an attachment pin extending outwardly from the first surface of the base for attaching the frame to the support structure.

In another aspect, the invention may provide a method of installing a pair of brackets on a rectangular frame with a plurality of right angle corners for hanging the frame on a support structure, including the steps of: providing a bracket having a base formed with a pair of right angle leg members terminating in a right angle corner and a fastener adjacent to an end of each of said leg members and an attachment pin extending from the base between the pair of leg members; placing two of the brackets on the frame, one bracket on each of a pair of frame members forming one of the right angle corners; pressing the right angled corner of each of the brackets into a respective one of the right angle corners of the frame; pressing the fasteners into the frame to secure the two brackets on the frame; and pressing the attachment pin of each bracket into a support structure to suspend the frame on the support structure free of any additional supporting hardware.

In another aspect, the invention may provide a bracket for mounting an object on a support structure wherein said object has a channel formed in an inner surface of said object, said bracket comprising: a body having an end surface and a projection extending outwardly from said end surface for engagement with the channel of said object; and an attachment pin mounted in the body and extending outwardly beyond a top surface of the body for attaching the object to the support structure.

In another aspect, the invention may provide in combination, a frame and a bracket for hanging said frame on a support structure; said frame having an inner surface and a channel formed in said inner surface; said bracket comprising: a body having an end surface and a projection extending outwardly from said end surface for engagement with the channel; and an attachment pin extending outwardly beyond a top surface of the body for attaching the object to the support structure.

In another aspect, the invention may provide a method of installing a bracket on a frame for hanging the frame on a support structure, including the steps of: providing a frame formed with a channel in an inner surface of the frame; providing a bracket having a body and a projection extending outwardly from the body and an attachment pin extending from the reinforcing member; slidably inserting the projection of the body into the channel of the frame to secure the bracket in the frame free of any additional attachments; and pressing the attachment pin of the bracket into a support structure to suspend the frame on the support structure free of any additional supporting hardware.

DESCRIPTION OF THE FIGURES

A sample embodiment of the invention is set forth in the following description, is shown in the drawings and is particularly and distinctly pointed out and set forth in the appended claims.

FIG. 1 is a top perspective view of the picture hanging bracket of the present invention.

FIG. 1A is a top plan view thereof without the attachment and securement pins.

Similar numbers refer to similar parts throughout the drawings.

DETAILED DESCRIPTION

Figure 2:
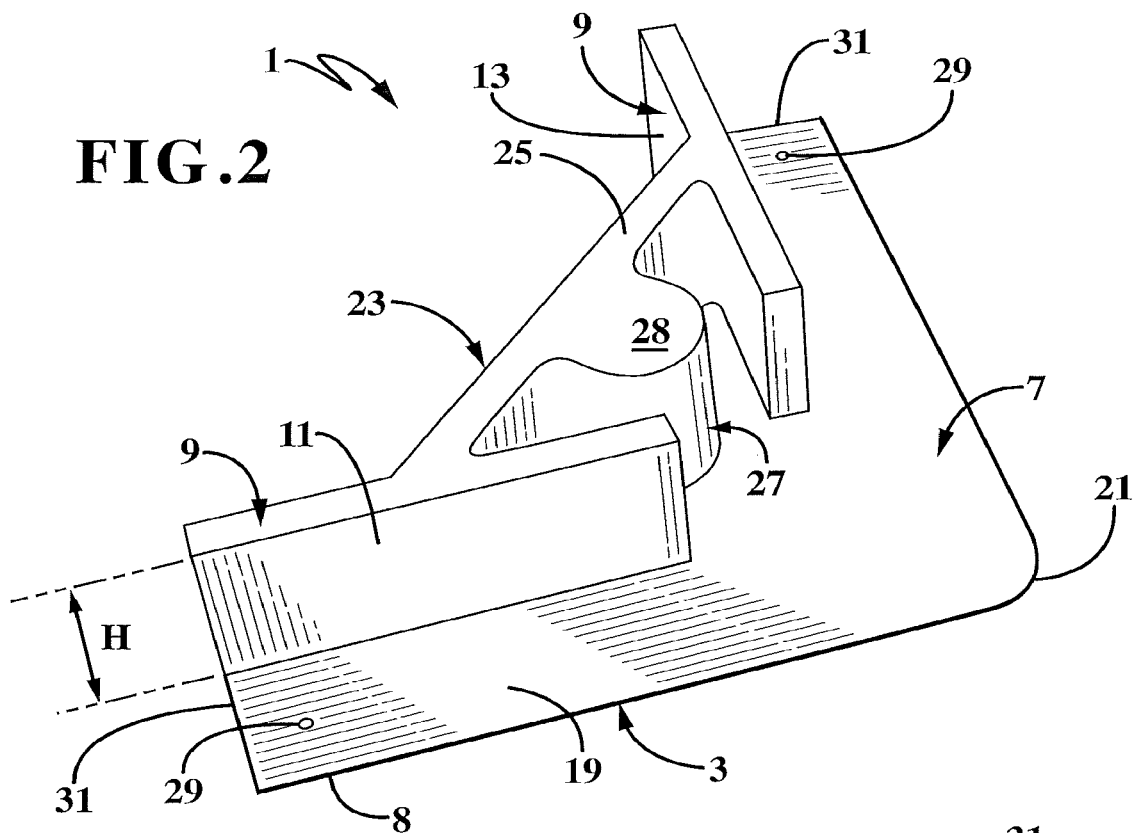
FIG. 2 is a bottom perspective view thereof.
Figure 2A:
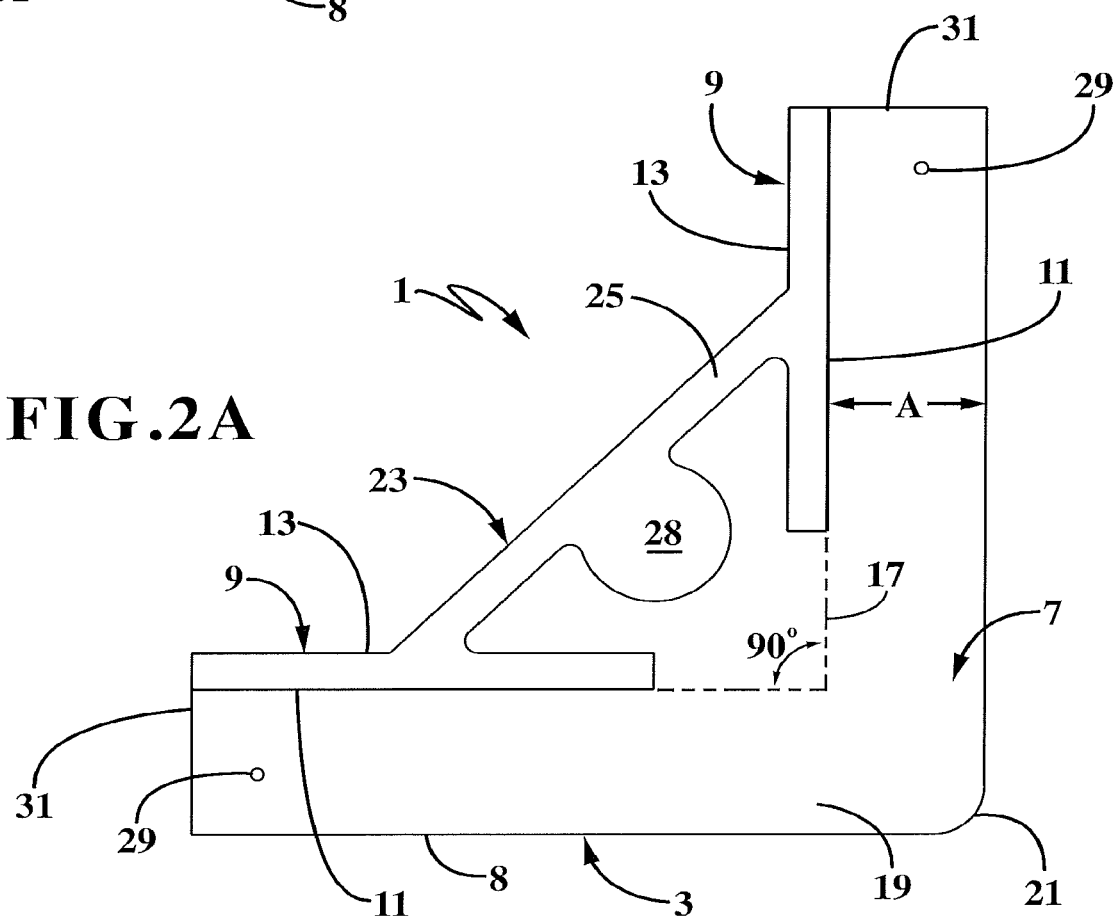
FIG. 2A is a bottom plan view without the attachment and securement pins.
Figure 3:
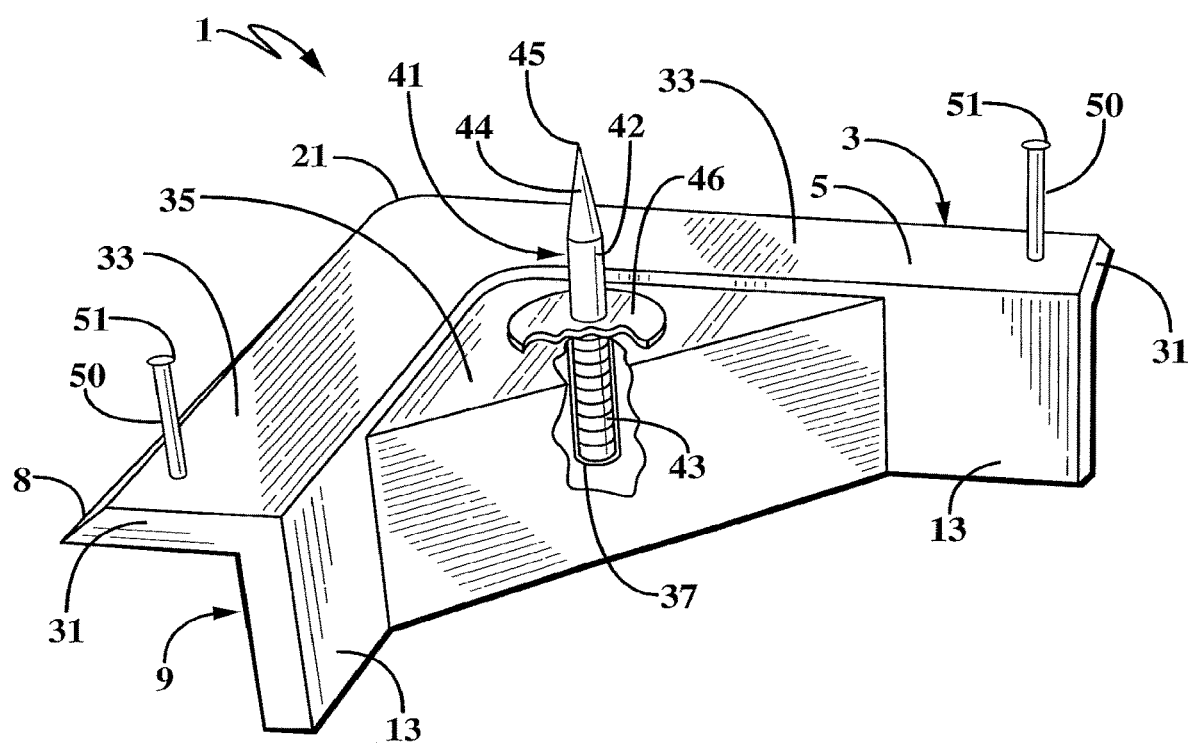
FIG. 3 is a top perspective view with portions broken away.

The hanging bracket of the present invention is indicated generally at 1, and is shown in particular in FIGS. 1-3. Bracket 1 preferably is formed of a onepiece member formed of a molded plastic material and includes a base indicated generally at 3, which includes first and second opposed surfaces hereinafter referred to as a bottom surface 7 and a top surface 5 which terminate in an outer beveled peripheral edge 8. A pair of legs, each indicated generally at 9, is formed integrally on and protects outwardly from bottom surface 7 (FIGS. 2 and 2A). Each leg 9 has a generally rectangular configuration with an outer side wall or surface 11 and an inner side wall or surface 13 terminating in a top peripheral edge 15. Legs 9 extend at 90 degrees with respect to each other forming a right angle corner, as shown by dashed lines 17 in FIG. 2A. If desired, legs 9 could merge into a V-shaped right angle corner as shown by dashed lines 17 without affecting their intended purpose and concept of the invention. Each wall 9 is spaced inwardly from peripheral edge 8 a distance A, which may be equal to the height H of each leg 9. Legs 9 being spaced from peripheral edge 8 form a generally V-shaped planar portion 19 on bottom surface 7 which is located between edge 8 and legs 9, and which terminates in an apex 21. Alternatively, bracket 1 may be formed from multiple pieces for shipping convenience without departing from the spirit of the present invention. Still further, bracket 1, Although preferably manufactured from plastic, may be manufactured from a variety of materials without departing from the spirit of the present invention.

A reinforcing rib 23 is formed integrally at a rear edge of bottom surface 7 and extends upwardly therefrom and is formed integrally with legs 9. Rib 23 has a top peripheral edge 25 which preferably lies in a common plane with top edges 15 of legs 9. Preferably some type of an enlarged area or reinforcement such as a reinforcing column 27 is formed integrally with base 3 and with a portion of reinforcing rib 23 and extends upwardly from base 3 in the same direction as legs 9. Column 27 has an outer end surface 28 which also preferably lies in the same common plane with top edges 15 and 25 of legs 9 and rib 23. A pair of thru-holes 29 are formed in the V-shaped planar portion 19 of bottom surface 7 and are spaced slightly inwardly from the outer ends 31 of V-shaped planar portion 19.

Referring particularly to FIGS. 1 and 1A, top surface 5 of base 3 has a generally V-shaped configuration formed by two planar surfaces 33 which form two legs of a triangular configuration and merge at apex 21. Planar surfaces 33 lie in a common plane and form the greater portion of top surface 5. A recessed planar portion is formed integrally with and extends diagonally between the inner edges of planar surfaces 33 forming a recessed web 35, which provides the bottom surface from which rib 23 and reinforcing column 27 extend in the opposite direction as shown in FIGS. 2 and 2A.

A hole 37 is formed in reinforcing column 27 and web 35 and receives therein an attachment pin 41, as shown particularly in FIG. 3. Attachment pin 41 includes a cylindrical shank or shaft 42 having a knurled or irregular lower end 43 which is embedded within hole 37, and a tapered top end 44 which terminates in a sharp pointed end 45. A circular generally flat disc or annular flange member 46 is mounted on shaft 42 between an irregular base or knurled end 43 and tapered end portion 44 and rests upon the upper triangular-shaped web 35 when pin 41 is embedded and fixed within reinforcing column 27.

In further accordance with the invention, a pair of securement pins 50 which may be slidably frictionally held within holes 29 until needed for securing bracket 1 on a picture frame as described later below or inserted therein when used to secure bracket 1 on a frame 55. Securement pins 50 have an enlarged blunt top end 51 and a pointed opposite end 52. Pins 50 are one type of fastener for securing bracket 1 to the back surface of a frame member. However, it is readily understood and within the scope of the invention that pins 50 can be other types of fasteners such as tacks, brads, screws, nails etc. and can even be an adhesive, a double-sided pressure sensitive adhesive pad or similar attachment device or fastener. Also, the frame can have a certain cross-section which snaps into a complementary member formed on the bracket to secure the bracket in the corner of the object being suspended thereby.

Figure 4:
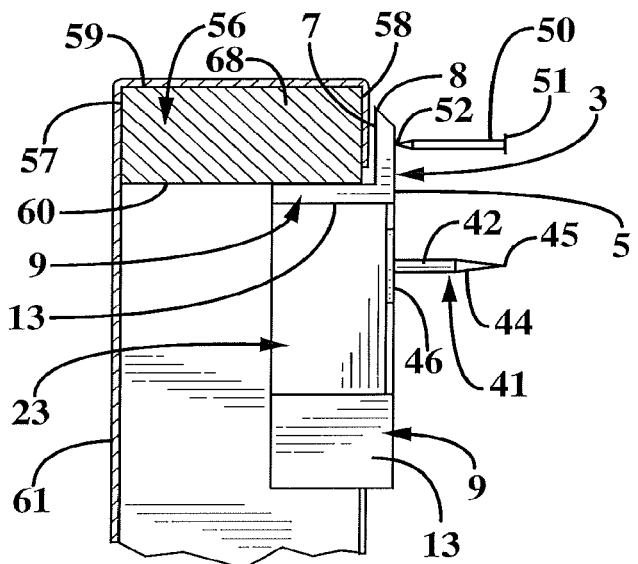
FIGS. 4 and 5 show the bracket being attached to a frame which is shown in section.
Figure 5:
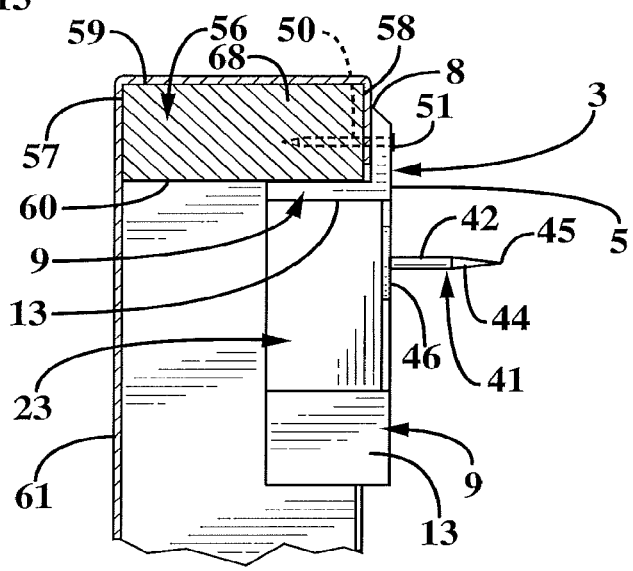
Figure 6:
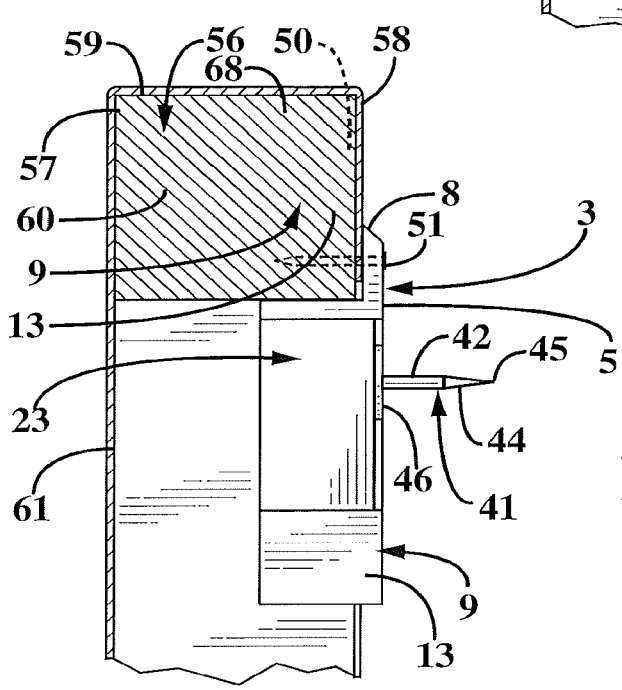
FIG. 6 is a view similar to FIGS. 4 and 5 showing the bracket attached to a different size frame.
Figure 7:
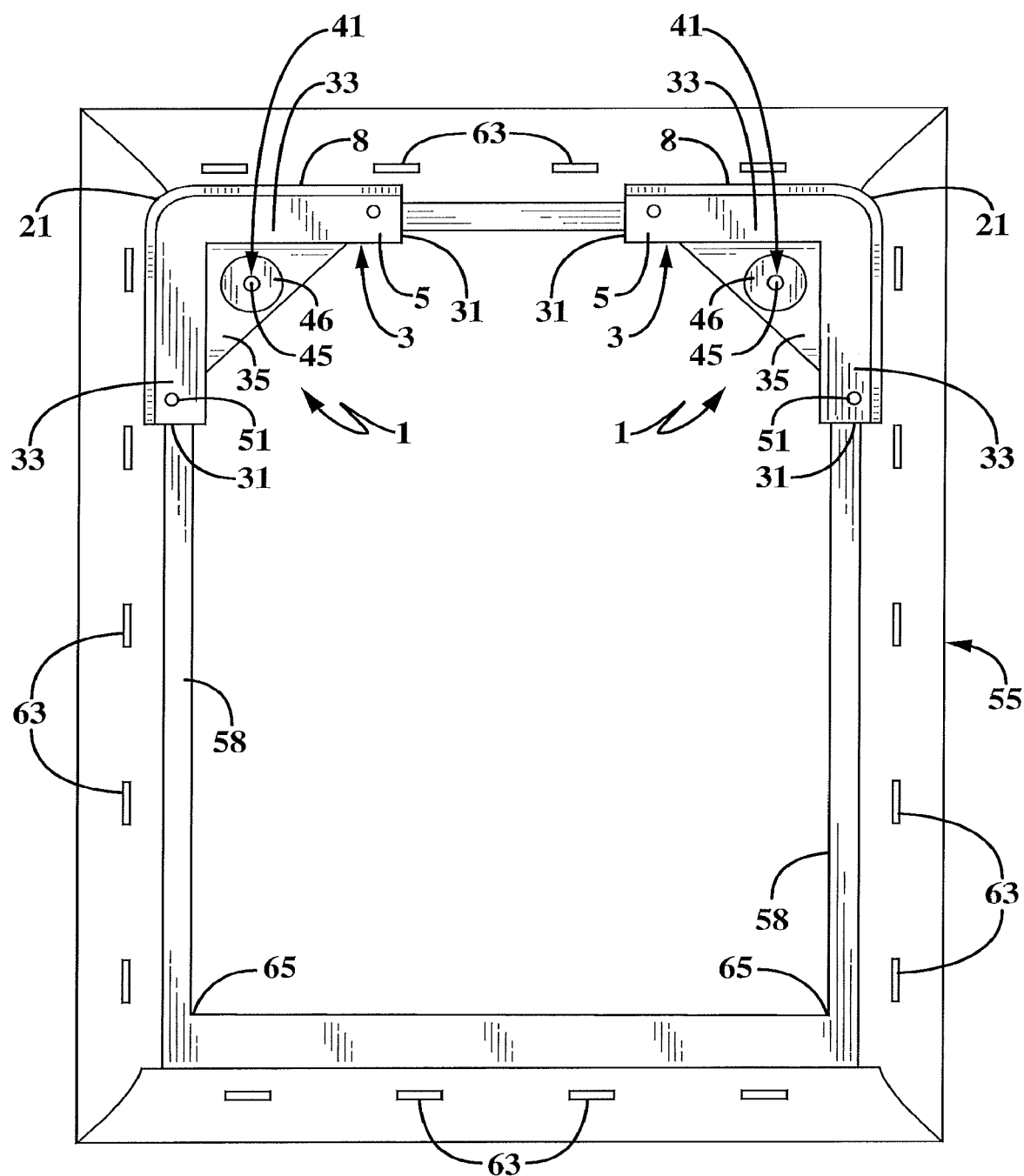
FIG. 7 is a rear plan view of two of the hanging brackets installed on a piece of canvas art.

The method of installing bracket 1 on a picture frame 55, and in particular a canvas picture frame, is best understood with references to FIGS. 4-7. A usual canvas art frame 55 will be rectangular formed by four frame members, each indicated generally at 56, which usually will have a rectangular cross-sectional configuration having a front surface 57, a rear surface 58 and outer and inner side surfaces 59 and 60. Frame members 56 will usually be formed of wood for most canvas art internal frames. The canvas art 61 is stretched over the front surfaces 57 of the four frame members and along the outer side surfaces 59 and along the rear surfaces 58 and usually secured to back surface 58 by a plurality of staples 63 (FIG. 7). Canvas art 61 can be attached to the frame members by an adhesive or other attachment means. The frame members 56 will form four inner right angle corners 65 at the junction of the top, bottom and side frame members as shown in FIG. 7. Bracket 1 is installed by laying the bottom surface 7 thereof and in particular, the V-planar portion 19 along and on top of rear surfaces 58 of the adjacent frame members 56 which form the two upper right angled corners pressing the V-shape angle formed by legs 9 tightly against the inner side surfaces 61 as shown in FIG. 4. Pressure is then applied downwardly on the V-shaped planar portions 33 followed by the subsequent pressing or driving of securement pins 50 through holes 29 and into the frame as shown in FIGS. 4 and 5. Securement pins 50 firmly affix bracket 1 onto frame 55 tightly secured within the upper two right angle corners 65 thereof as shown in FIG. 7.

Figure 8:
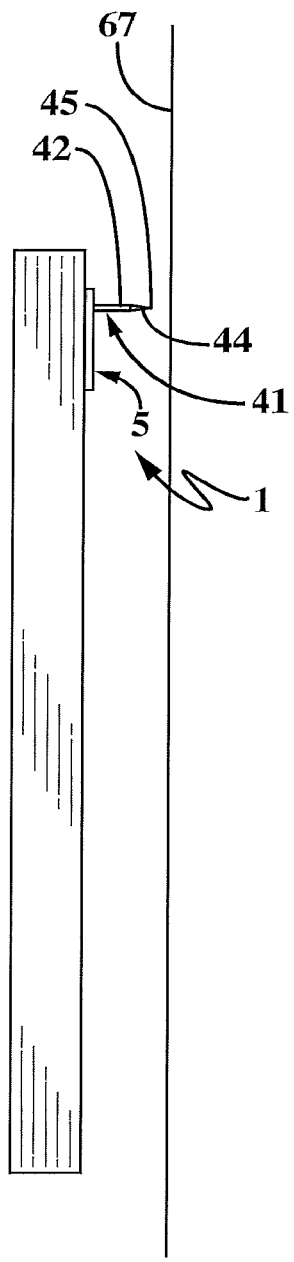
FIG. 8 is a side view of the canvas art just before being attached to a supporting structure.

With two brackets 1 in their attached position on frame 55, the frame is placed adjacent a wall 67 or other support structure as shown in FIG. 8, and pressed firmly thereagainst in the direction of Arrow B. This presses pointed ends 45 of attachment pins 41 into the support structure as shown in FIG. 8. Pins 41 will support frame 55 on and substantially flush against the surface of wall 67 with no additional hardware being required or visible as with prior canvas art hardware hangers or brackets.

Thus, a canvas painting or artwork 61 is easily mounted on a wall requiring only two small puncture holes therein caused by pointed ends 45 and shafts 42 of attachment pins 41. Pins 41 are easily installed on the back of the canvas painting requiring only the driving or forcing of the two small securement pins 50 into the frame once the angled legs or flanged areas of the bottom surface of the bracket are placed along the inner frame surfaces as shown in FIG. 4 after pressing legs 9 against the inner surfaces 60 of the frame members which form the two upper right-hand angled corners.

As shown in FIG. 6, the size of the height and depth of another frame member 68 can vary appreciably from that of the frame member as shown in FIGS. 4 and 5, without affecting the size and method of installing two corner brackets 1 on the upper two right-angled corners of the frame. The only feature required is that the length or height H of legs 9 be at least equal to or less than the height or thickness of the bracket 68, as shown by side surfaces 59 and 60 in FIGS. 4 and 5. Thus, a single size of bracket 1 will easily fit and be used with nearly all sizes of wooden frames constructed for use with canvas art. In the event that the canvas frame is of a considerable size and weight, the overall size of bracket 1 can be increased as needed to support a greater weight than most sizes of canvas art.

Also, bracket 1 preferably is easily and inexpensively molded of a plastic material requiring only the formation of two holes 29 therein in which pins 50 may be subsequently installed, usually with a friction fit so as to remain attached to the bracket until it is necessary to drive them through bracket holes 29 and into the wooden frame as shown in FIGS. 4 and 5, or with pins 50 being packaged with bracket 1 unsecured in holes 29. This frictional fit of pin 50 in holes 29 eases the installation of the bracket on the picture frame eliminating loss or misplacement of pins 50. Also, the only other manufacturing step required is the embedding of attachment pin 41 within hole 37 which can easily be accomplished by a force fit or staking of pin 41 in hole 37 when molding of bracket 1 where it is securely held due to the irregular or knurled surface 43 at the opposite end from pointed end 45.

Also, as shown in FIGS. 4-7, one of the legs 9 of each bracket 1 functions as a shelf for supporting the frame thereon with the other leg 9 functioning as a guide for positioning bracket 1 within a respective right angled corner of the frame.

A second embodiment of the picture hanging bracket of the present invention is indicated generally at 70, and is shown in FIGS. 10-13. Hanging bracket 70 is similar to that of bracket 1 discussed above in that it includes bottom surface 7, legs 9 extending outwardly therefrom which form a right angled corner and forms v-shaped planar portion 19 in which two holes 29 are formed adjacent the outer ends thereof for receiving securement pins 50 or other type fasteners as discussed with bracket 1 above. It also includes a rib 71 extending between legs 9 having an enlarged or reinforced area such as column 72 formed integrally therewith and extending downwardly from a triangular-shaped web 73 extending between rib 71 and planar surfaces 33 of top surface 5 as in bracket 1.

Figure 10:
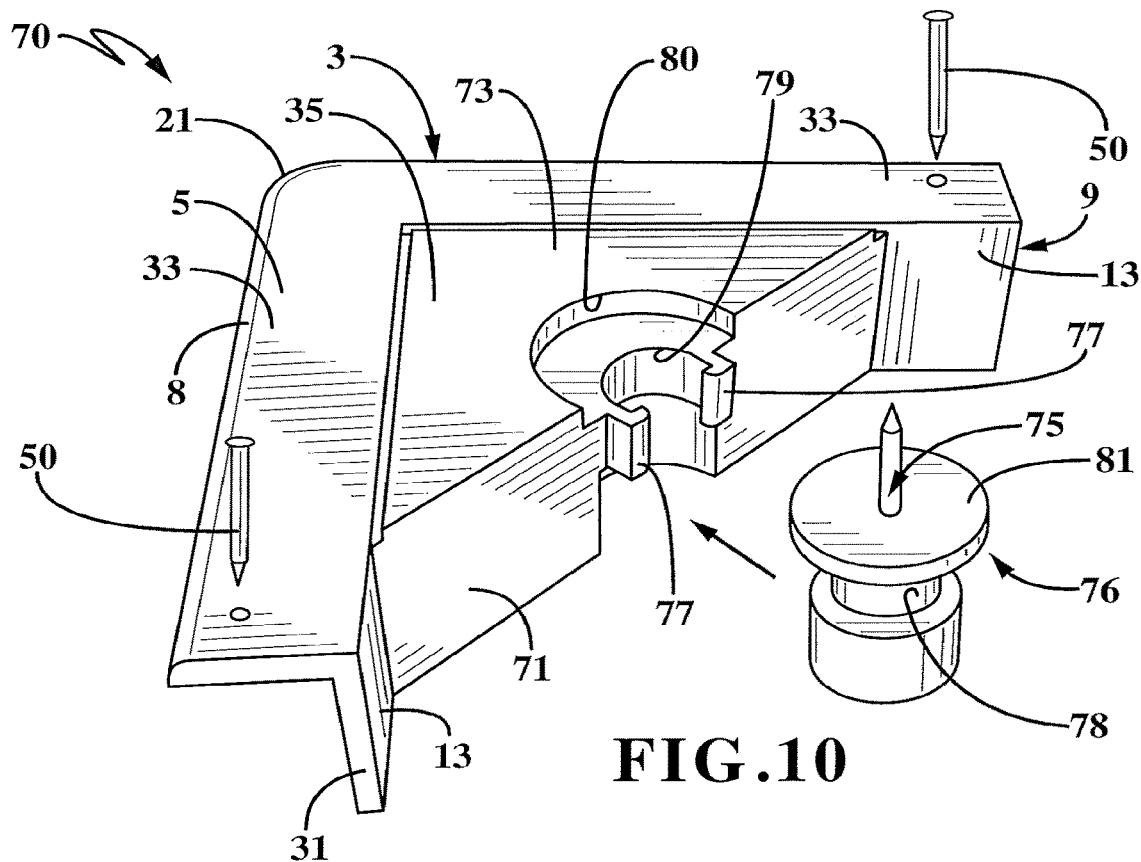
FIG. 10 is an exploded top perspective view of a second embodiment of the picture hanging bracket of the present invention.
Figure 11:
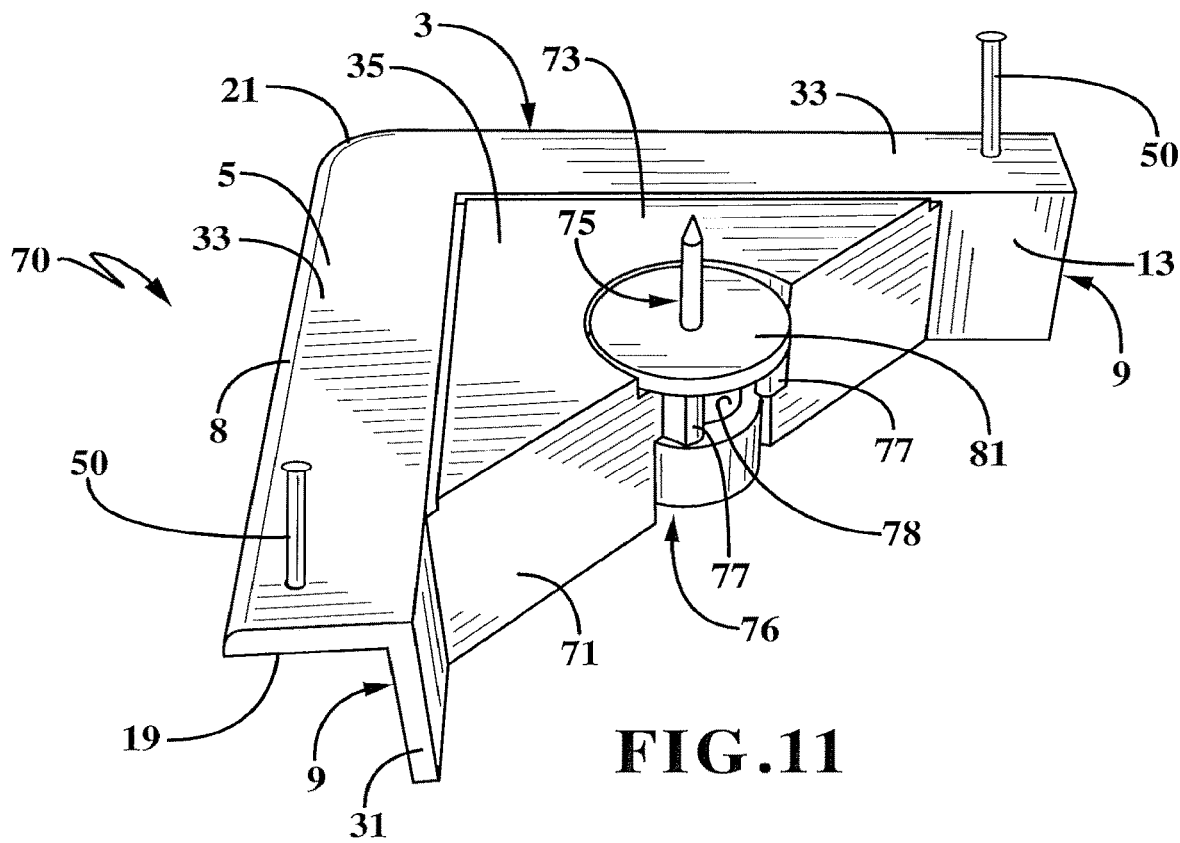
FIG. 11 is a top perspective view showing the bracket of FIG. 10 in assembled condition ready for installing on a picture frame.
Figure 12:
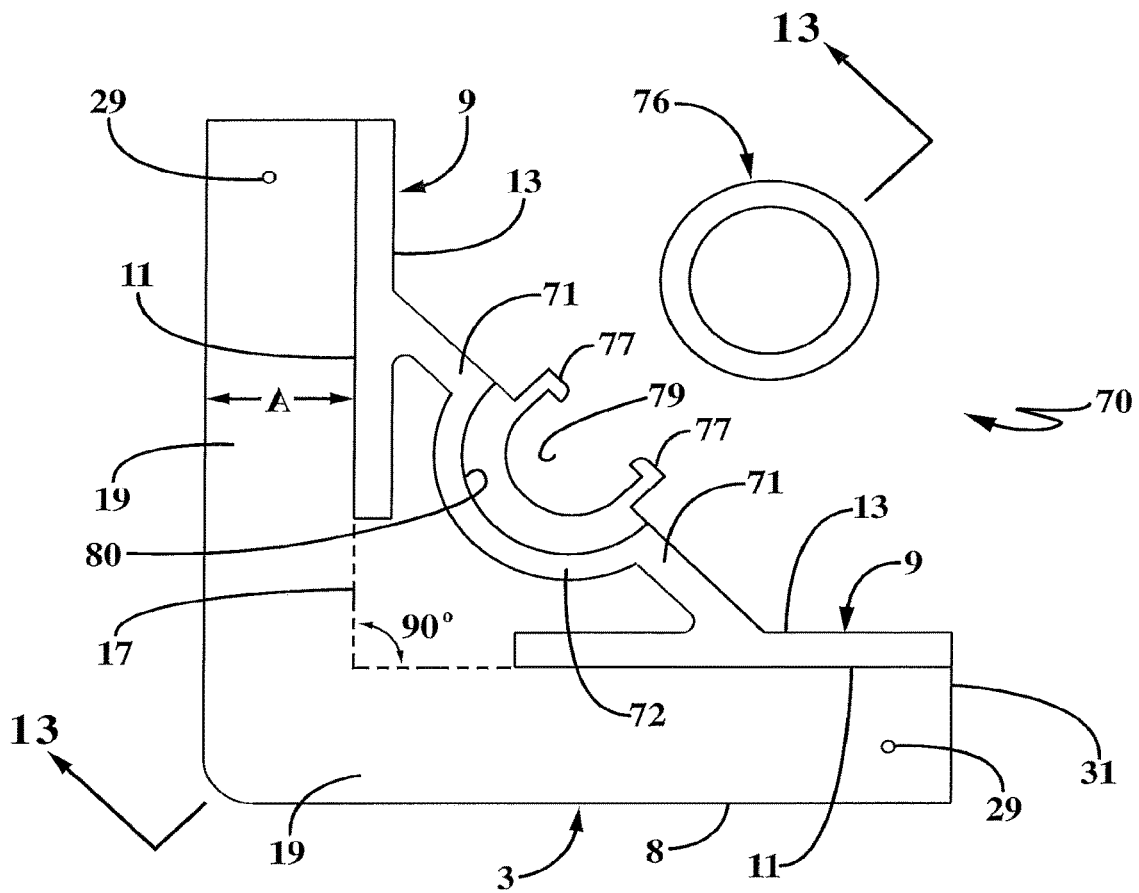
FIG. 12 is an exploded bottom plan view of the second embodiment of FIGS. 10 and 11.
Figure 13:
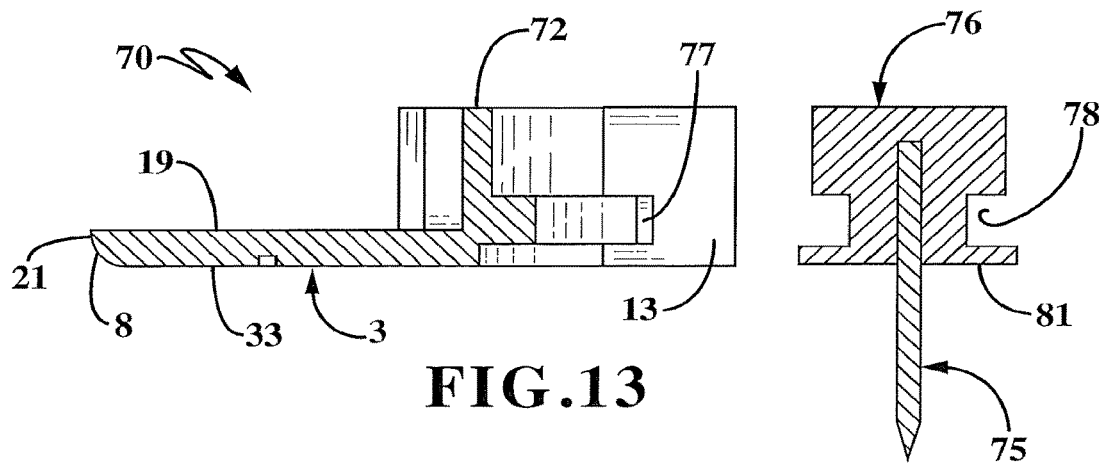
FIG. 13 is a sectional view taken on line 13-13, FIG. 12.

The main difference between bracket 70 and bracket 1 is that the attachment pin 75 is embedded in a cylindrical shaft indicated generally at 76, which is removably mounted between a pair of snap fingers 77 as shown in FIGS. 10 and 12. Cylindrical shaft 76 preferably is formed with an annular channel 78 in which snap fingers are engaged as shown in FIG. 11 to retain shaft 76 in a semicircular opening 79 formed between the snap fingers in web 73 and reinforcing column 72. Web 73 preferably is formed with a generally semicircular depression 80 which receives the circular disc-shaped top portion 81 of cylindrical shaft 76 as shown in FIG. 11.

This removable mounting of attachment pin 75 of bracket 70 enables the pin to be stored in the body of the hanger during transport and prior to set up and also allows a number of other items to be clipped and stored in the same package, for example a wall-marking device or a cavity to accept the head or hanging hardware such as a deco nail or deco screw etc. Likewise, securement pins 50 can be packaged in the same package with attachment pin 75.

Figure 9:
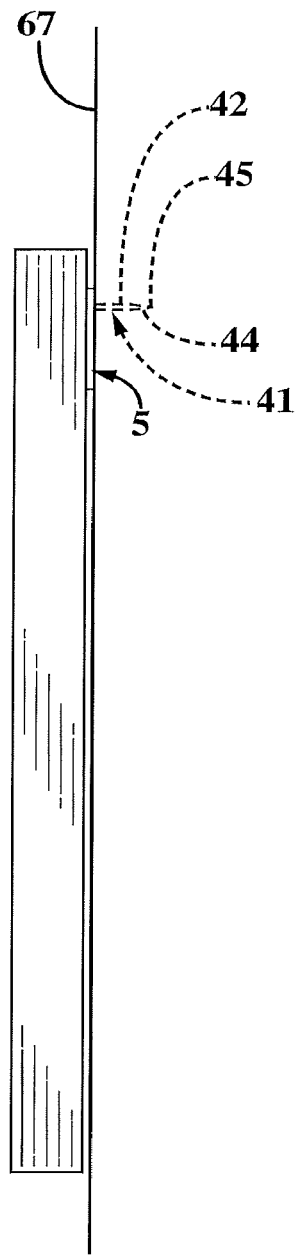
FIG. 9 is a view similar to FIG. 8 showing the canvas art completely attached to the supporting structure.

Thus, bracket 70 is secured in the same manner as bracket 1 in the upper two right hand corners of a picture frame as shown in FIG. 7 and discussed above, and secured therein by securement pins 50 or other type of fasteners, after which shaft 76 containing attachment pin 75 is snap-fitted in position as shown in FIG. 11 and then secured to a supporting structure by a pair of attachment pins 75 in the same manner as that described above and shown in FIGS. 8-9.

This arrangement of removably mounting attachment pin 75 in the base 3 of bracket 70 has a number of other advantages including the ability to modify certain dimensions and profiles of the hanger body so that the variations become an effective solution for not only canvas art, but picture frames made of wood and metal. This also provides the ability that the various elements can be combined in different ways to create solutions for different hanging and frame scenarios.

A third embodiment of the picture hanging bracket of the present invention is indicated generally at 85, and is shown in FIGS. 14-17. Bracket 85 is similar to that of brackets 1 and 70 discussed above in that it has the same right angle forming legs 9 and V-shaped bottom planar portion 19 and holes 29 for receiving a pair of securement pins 50 or other type fasteners for securing the bracket in a selected right angle corner of a picture frame. The main difference of bracket 85 with respect to bracket 70 is that a circular hole 86 is formed in a reinforcing column 97 similar to that of reinforcing columns 27 and 72 discussed above, which extends from the bottom surface of a triangular web 95 extending between legs 9 and planar surfaces 33 of the bracket in a similar manner as reinforcing column 72 of bracket 70. A reinforcing rib 96 preferably extends between legs 9 and is integrally formed with web 95 and the reinforcing column 97 in a similar manner as ribs 23 and 71 discussed above. Circular hole 86 is formed with a pair of diametrically opposed arcuate interior channels 87 formed in cylindrical side wall 88 which forms hole 86, which channels communicate with a pair of small axially extending channels 89. A cylindrical plug 90 has a pair of nubs 92 extending diametrically opposite from each other and has an attachment pin 93 embedded therein and extending axially from the center of plug top surface 94.

Figure 14:
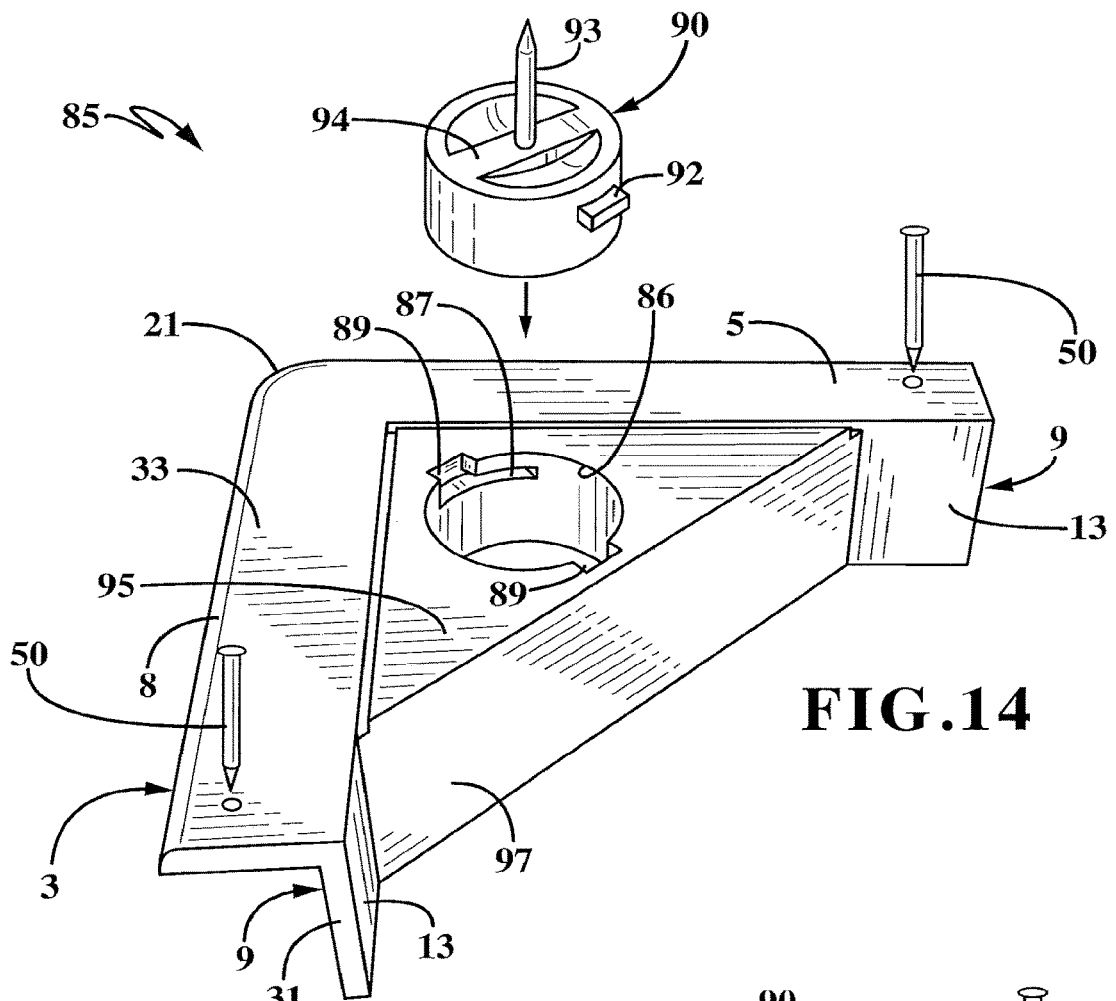
FIG. 14 is an exploded top perspective view of a third embodiment of the picture hanging bracket of the present invention.
Figure 15:
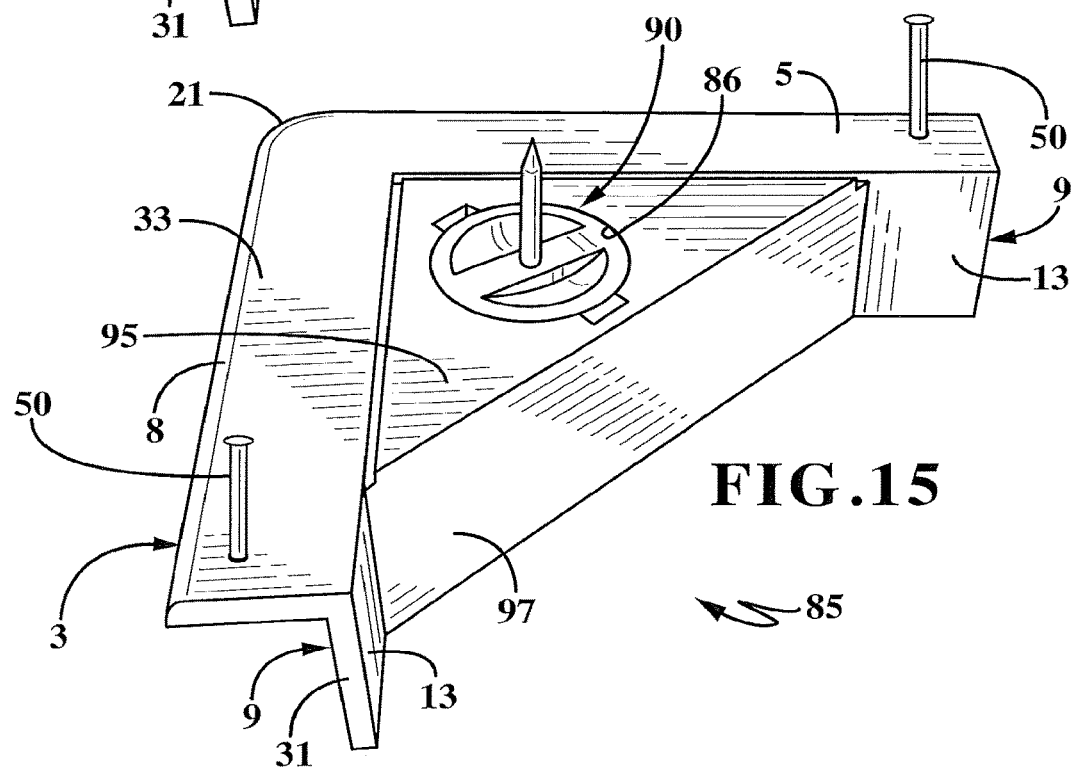
FIG. 15 is a top perspective view of the picture hanging bracket of FIG. 14 in assembled condition.
Figure 16:
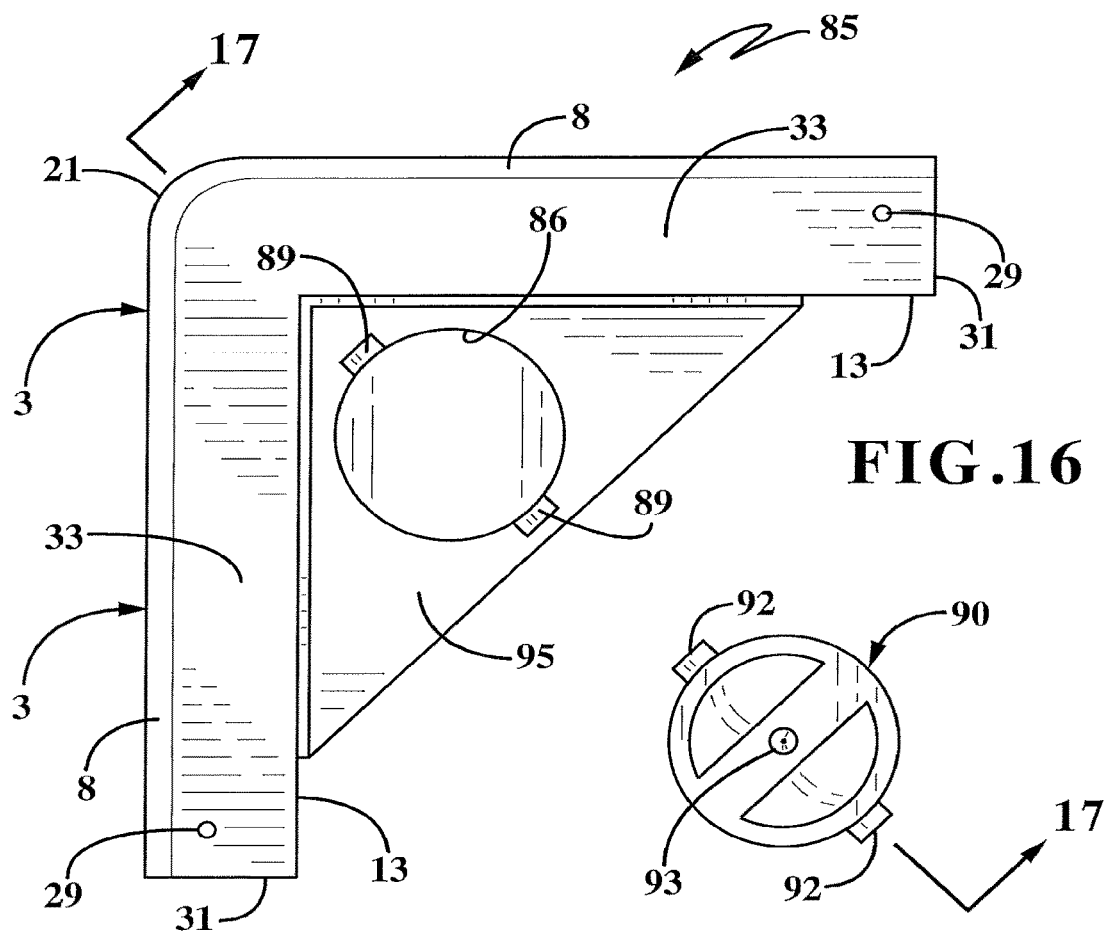
FIG. 16 is an exploded top plan view of the third embodiment of the picture hanging bracket of FIGS. 14 and 15.
Figure 17:
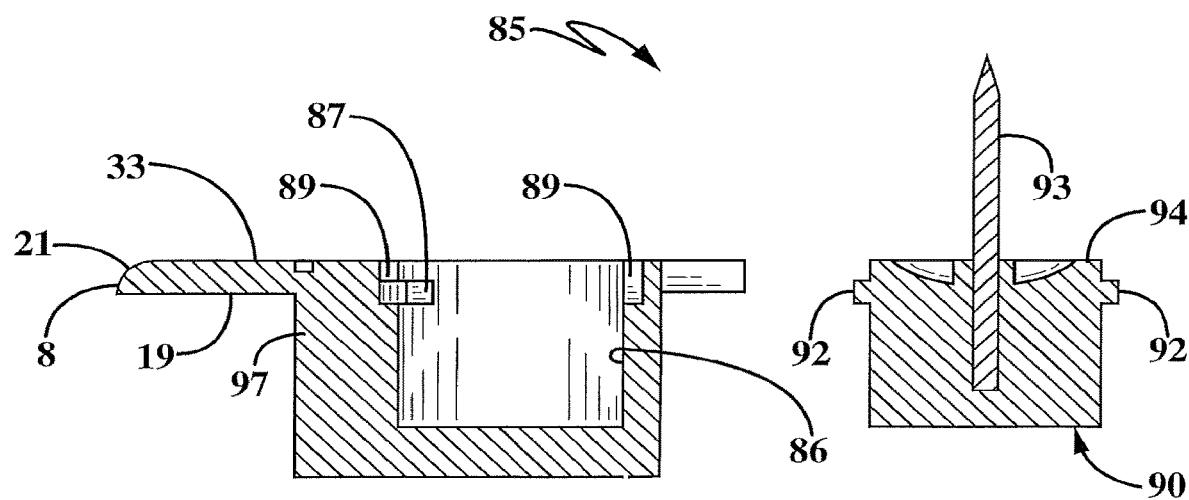
FIG. 17 is a sectional view taken on line 17-17, FIG. 16.

Plug 90 is removably mounted in circular hole 86 by slidably inserting nubs 92 into axial channels 89 after which the plug is rotated in a clockwise direction when viewing FIG. 14 whereby the nubs slide into arcuate channels 87 to secure plug 90 within hole 86.

This construction again enables attachment pin 93, and in particular plug 90, together with securement pins 50, to be packaged in a separate package or attached in a convenient manner to the body of bracket 85 for storage and shipment. Plug 90 is easily inserted and secured within hole 86 prior to or after the bracket has been secured to the picture frame by securement pins 50 in the same manner as discussed above with respect to brackets 1 and 70. Bracket 85 provides a different embodiment for removably attaching the attachment pin to the bracket than that of the snap-fit construction of shaft 76 of bracket 70. The remaining features of bracket 85 are the same as that of brackets 1 and 70 with respect to the bottom surface thereof which includes the right angle forming legs 9 which form V-shaped planar portion 19 terminating in apex 21.

A fourth embodiment of the picture hanging bracket of the present invention is indicated generally at 100, and is shown in FIGS. 18-22. Bracket 100 is similar to that of brackets 1, 70 and 85 discussed above in that it includes the same right angle forming legs 9, V-shaped planar portion 19, peripheral edge 8, securement pin-receiving holes 29, securement pins 50, or other type fasteners, etc. A reinforcing rib 103, triangular-shaped web 104 and reinforcing column 108 similar to that described above with respect to brackets 70 and 85 and webs 73 and 95 are formed on and extend outwardly from the bottom surface of the bracket and web 104.

Figure 20:
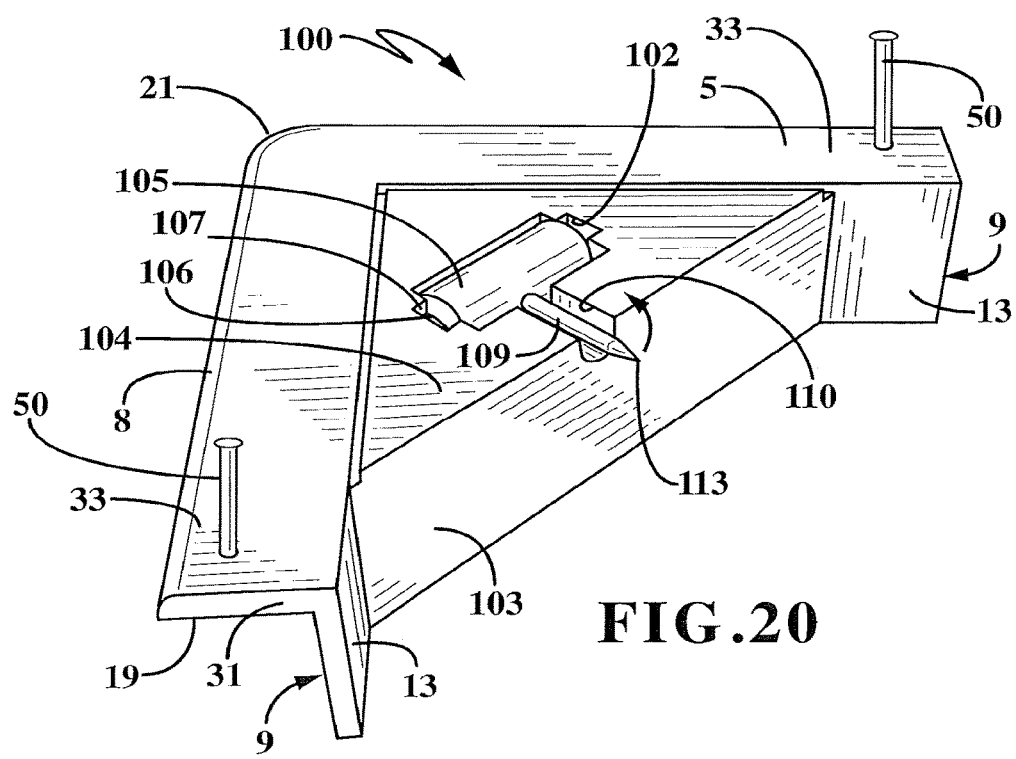
FIG. 20 is a top perspective view similar to FIG. 19 with the attachment pin in a retracted position.
Figure 21:
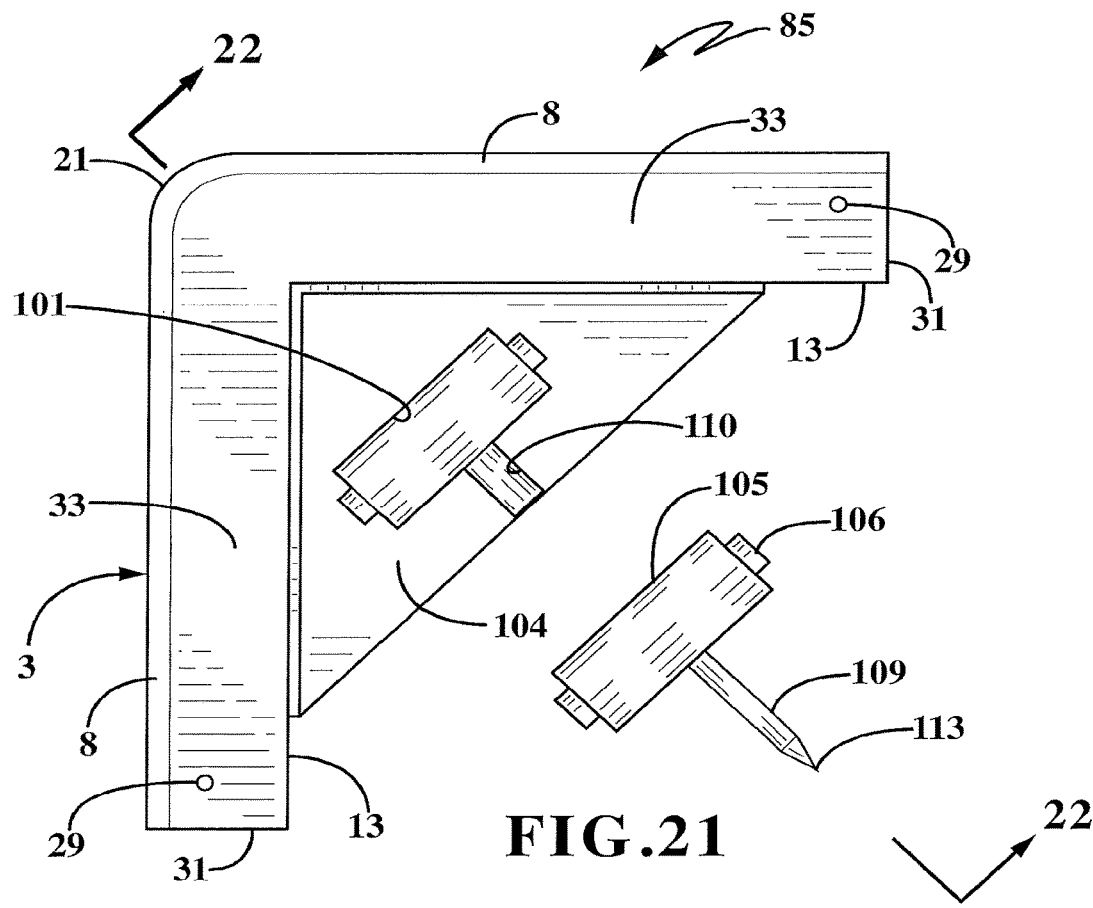
FIG. 21 is an exploded top plan view of the picture hanging bracket of FIG. 18.
Figure 22:
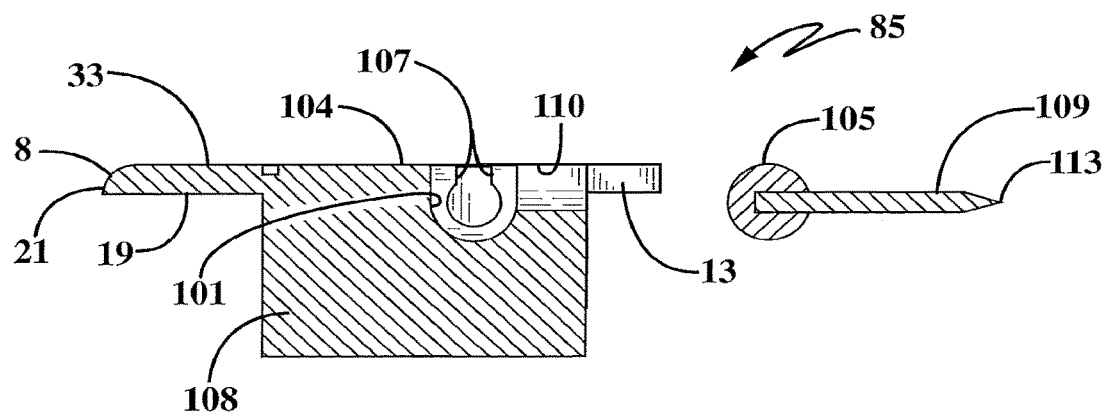
FIG. 22 is a sectional view taken on line 22-22, FIG. 21.

An elongated semicylindrical opening 101 is formed in web 104 and reinforcing column 108 and terminates in reduced semicircular counterbores 102. A cylindrical shaft indicated generally at 105 is adapted to be snap-fitted into opening 101 and secured therein by a pair of reduced diameter shaft ends 106 which are received into counterbores 102 formed in the reinforcing column and triangular web 104. A pair of shoulders 107 are formed at the top openings of counterbores 102 for receiving shaft ends 106 in a snap-fit engagement, which rotatably mounts shaft 105 within cylindrical opening 101. An attachment pin 109 is embedded in shaft 105 and extends outwardly therefrom in a direction perpendicular to the rotational axis of shaft 105, and when in a retracted position as shown in FIG. 20 lies in a slot 110 formed in the top surface of web 104 and the outer surface of the diagonally extending reinforcing rib 103.

Figure 18:
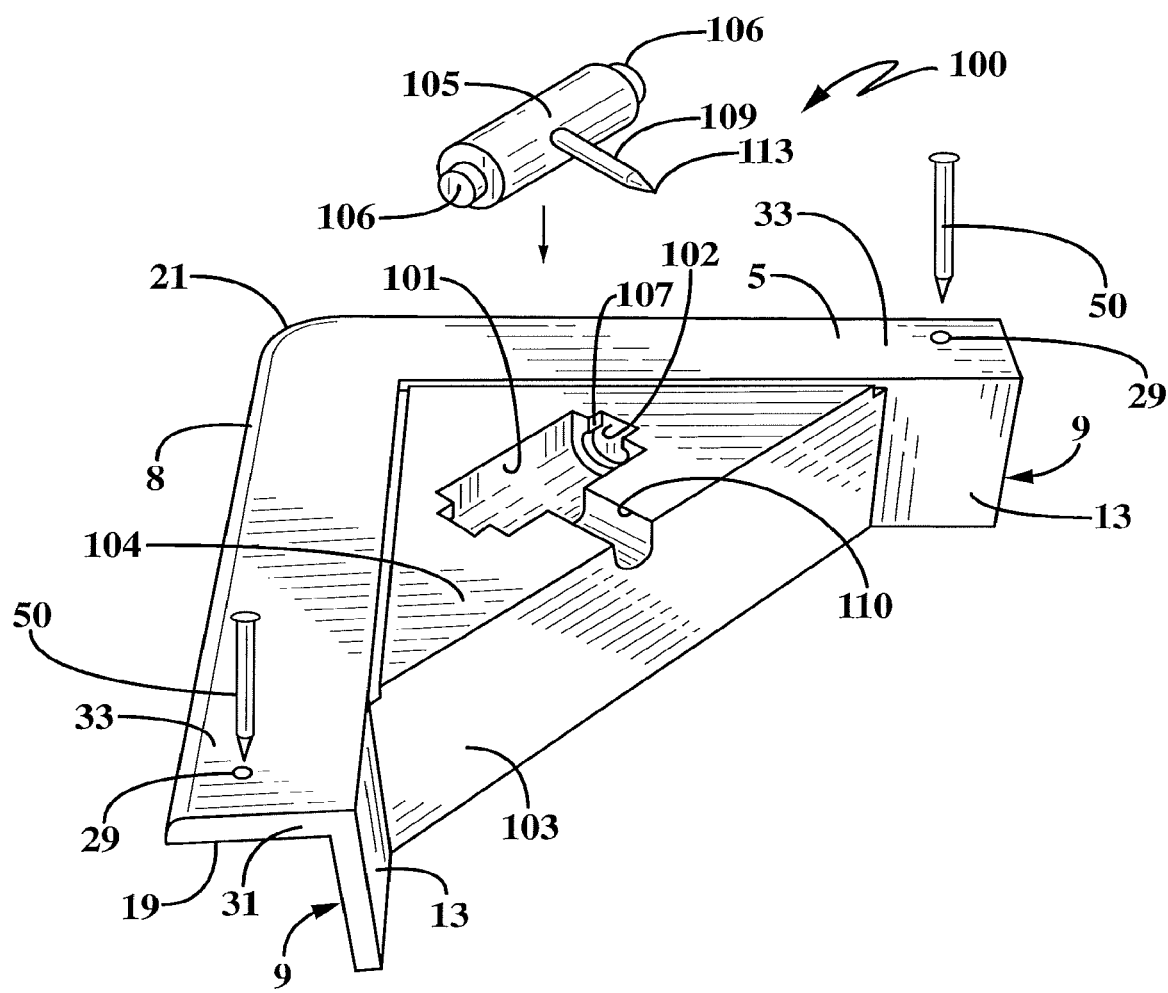
FIG. 18 is an exploded top perspective view of a fourth embodiment of the picture hanging bracket of the present invention.
Figure 19:
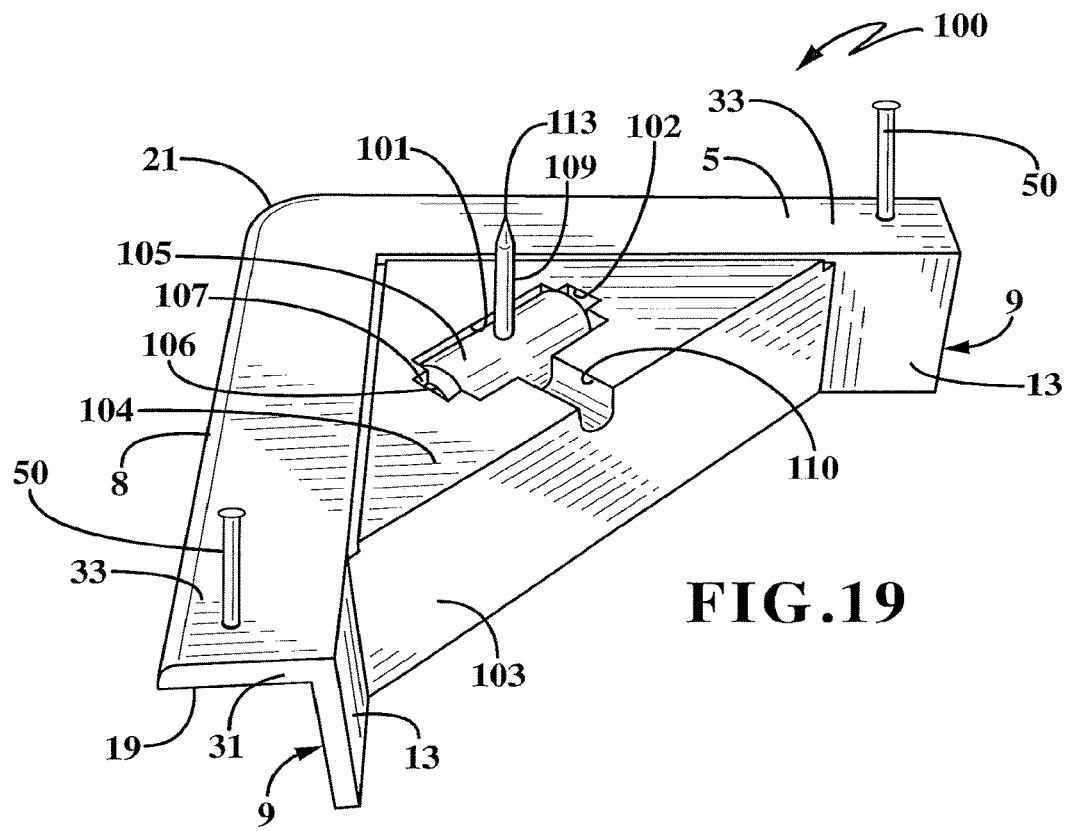
FIG. 19 is a top perspective view of the picture hanging bracket of FIG. 18 in assembled condition with the attachment pin in an extended position.

The construction of bracket 100 is similar to that of brackets 70 and 85 in that it enables the attachment pin 109 to be packaged and shipped detached from the bracket body and then removably secured in the bracket body just prior to or after the bracket has been secured to the picture frame by securement pins 50. Also if desired, shaft 105 can be rotatably mounted in the bracket body as shown in FIG. 20 for shipment and then pivoted to the extended position of FIG. 19 by the user thereof without having to be attached to the bracket body by the user as shown in FIG. 18. Also if desired, the length of slot 110 and attachment pin 109 can be adjusted so that the pointed end 113 thereof will not extend beyond the outer surface of rib 103 and is completely protected within the surrounding material of web 104 and rib 103 to eliminate any sharp protrusion for packaging and shipping the bracket in assembled condition.

Brackets 70, 85 and 100 are attached to a frame by various type fasteners including adhesives, and to a support structure in the same manner as described above for bracket 1. Likewise, they are preferably molded of a plastic material in various sizes and thicknesses for use with various sizes and weights of objects, and in particular picture frames, and can be formed of metal or other materials without affecting the concept of the present invention.

Again, as with bracket 1, one of the legs 9 extending from the bottom surface 7 of the base will function as a shelf for supporting the picture frame thereon with the other leg 9 functioning to position the bracket in a respective right angled corner of the object to be supported by a pair of brackets.

Brackets 70, 85 and 100 provide the additional advantage of improved packaging and shipment of the brackets and interchangeable components.

Figure 24:
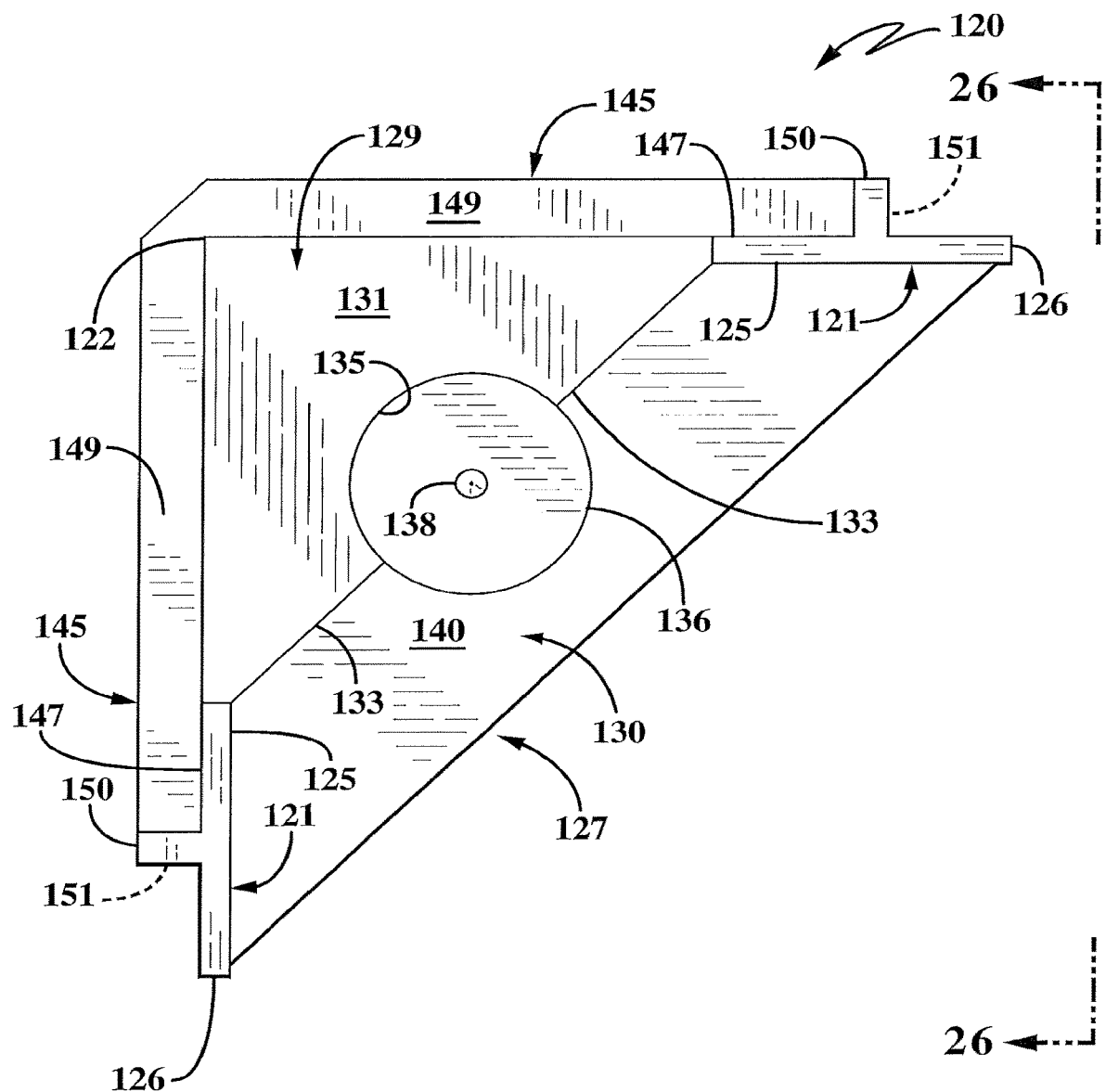
FIG. 24 is a top plan view of the picture hanging bracket of FIG. 23.
Figure 25:
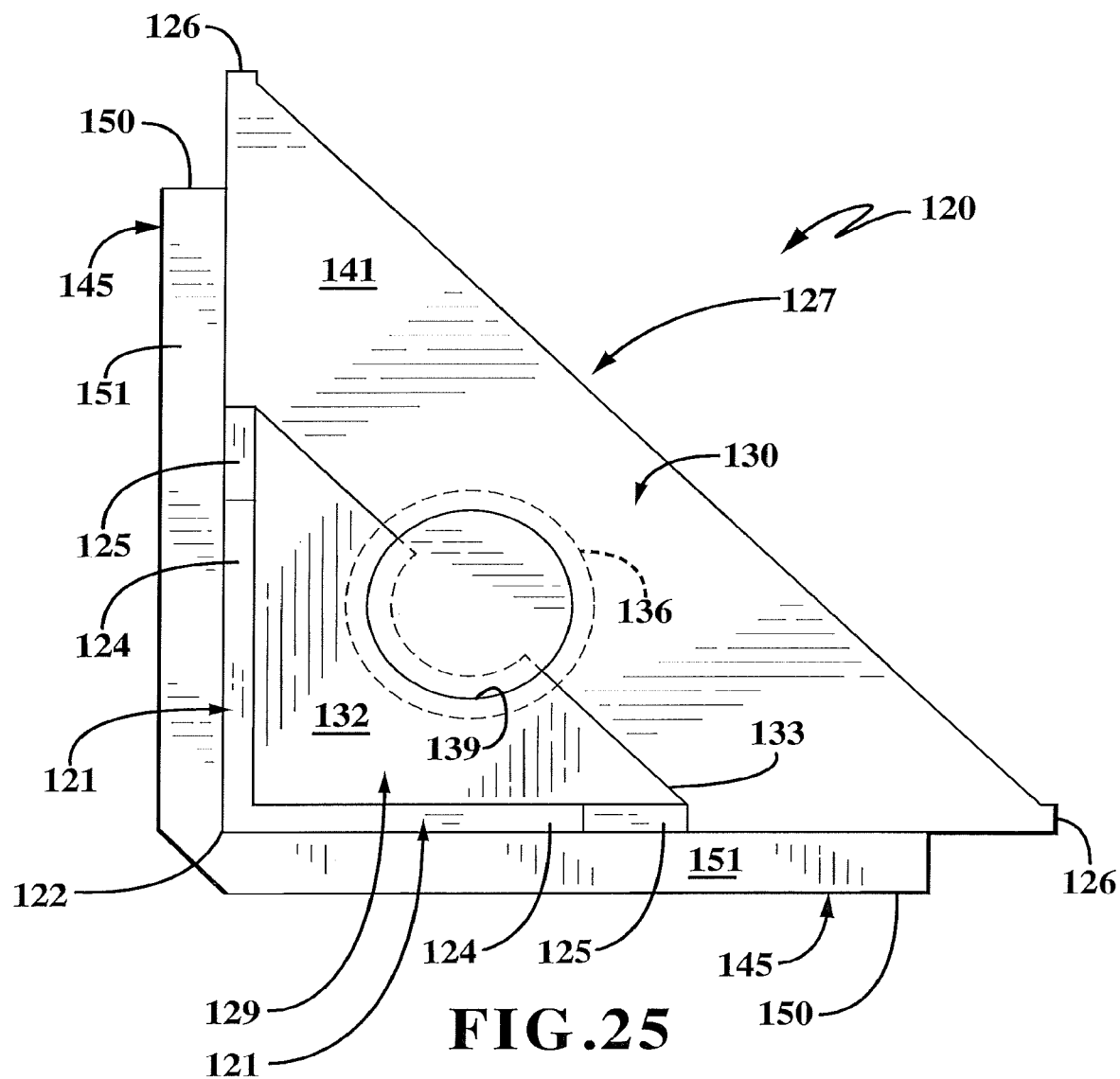
FIG. 25 is a bottom plan view of the picture hanging bracket of FIG. 24.
Figure 26:
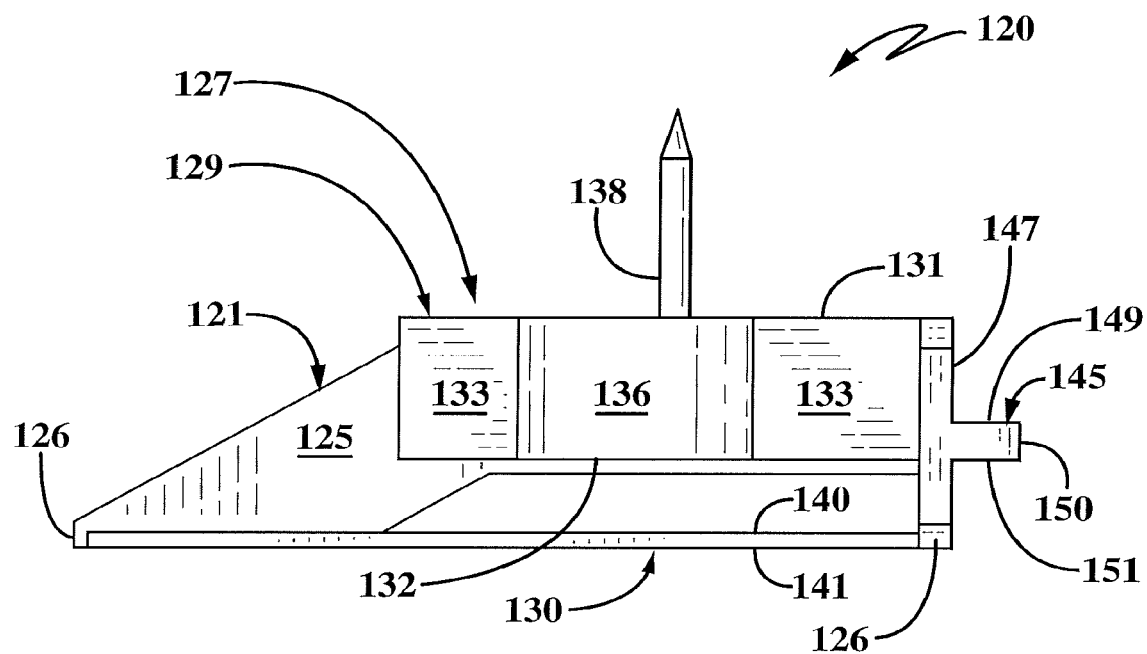
FIG. 26 is a side elevational view looking in the direction of Arrows 26-26, FIG. 24.
Figure 27:
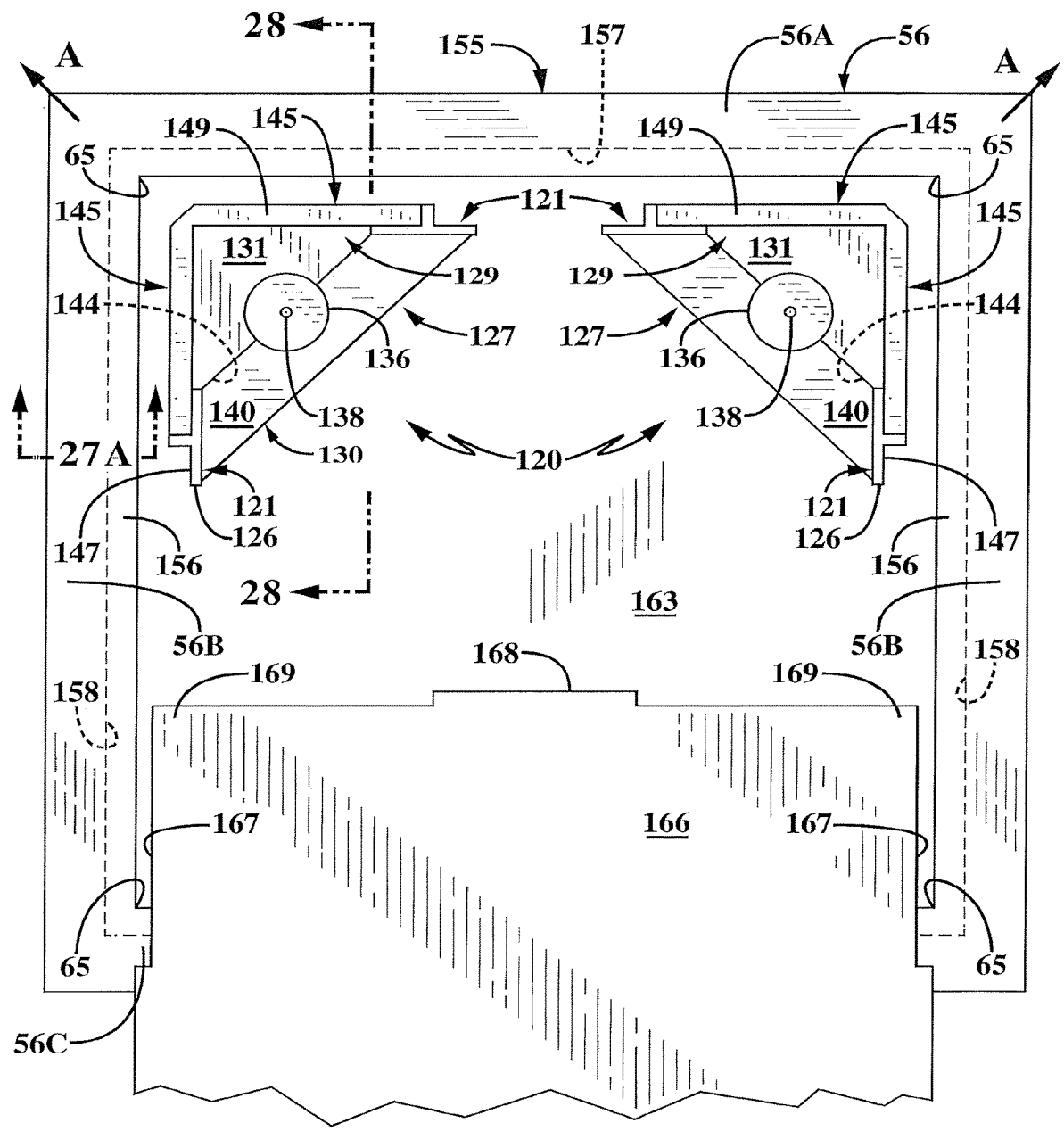
FIG. 27 is a rear plan view of two of the hanging brackets of FIGS. 23-26 being installed on a frame with a backing plate partially inserted therein.
Figure 28:
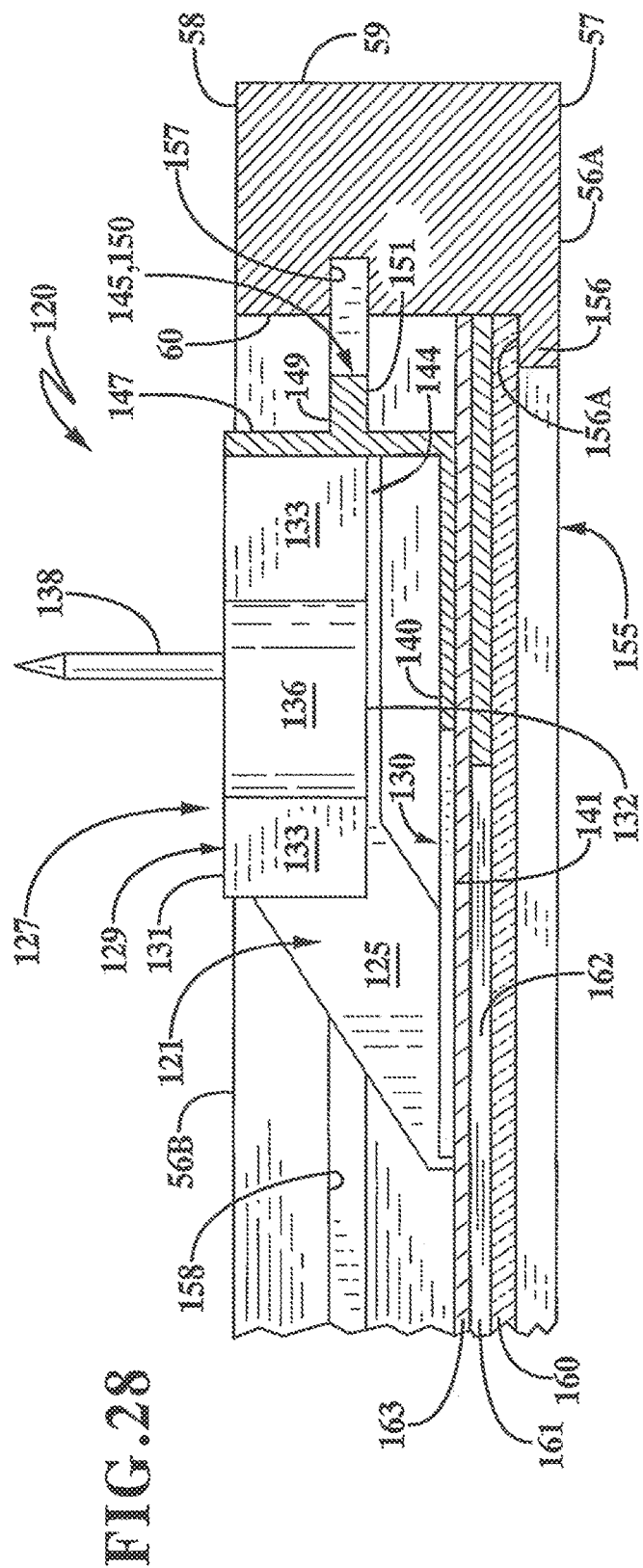
FIG. 28 is an enlarged fragmentary sectional view taken on lines 28-28, FIG. 27.
Figure 27A:
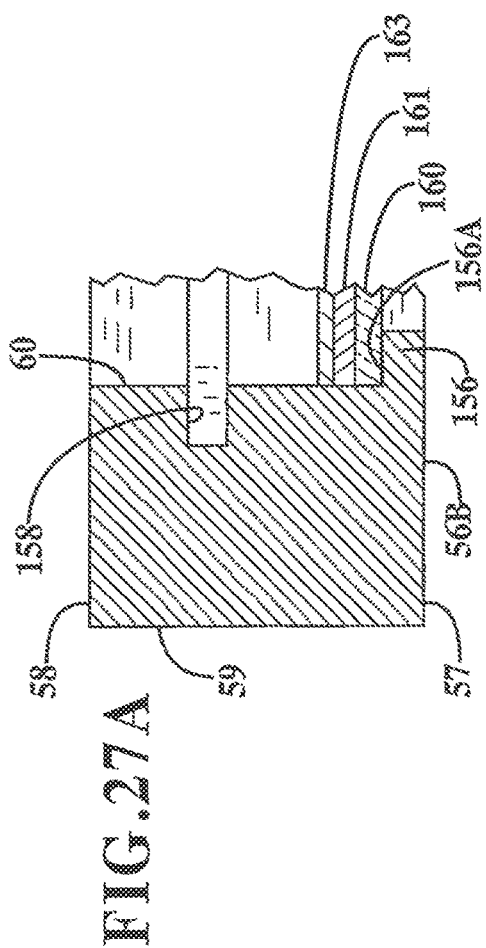
FIG. 27A is an enlarged fragmentary sectional view taken on line 27 A-27A, FIG. 27.

A fifth embodiment of the picture hanging bracket of the present invention is indicated generally at 120, and is shown in FIGS. 23-31. Bracket 120 includes a pair of right angle forming legs 121 which terminate at a corner 122 (FIG. 25). Each leg 121 includes a generally rectangular portion 124 which extends rearwardly from corner 122, and a triangular-shaped leg portion 125 terminating in ends 126. A reinforcing body indicated generally at 127, is formed integrally with and extends between legs 121. Reinforcing body 127 includes an upper member 129 and a lower member 130, both of which are formed integrally with and extend between legs 121. Upper reinforcing member 129 has a triangular configuration with a top surface 131, a lower surface 132, and an end surface 133. A general semicircular cutout or opening 135 is formed in upper reinforcing member 129 and extends inwardly from end surface 133 for removably receiving a cylindrical shaft 136 in which an attachment pin 138 is embedded. Shaft 136 and pin 138 are similar to shaft 76, plug 90, and attachment pins 75 and 93 discussed above.

Lower reinforcing member 130 has an elongated generally flat configuration with an upper surface 140 and a lower surface 141 which form a shelf-like flat planar member extending between the triangular portions 125 of spaced legs 121 adjacent ends 126 thereof. Lower reinforcing member 130 is spaced below upper reinforcing member 129 and forms an elongated opening or passage 144 therebetween. Another semicircular opening 139 may be formed in lower reinforcing member 130 aligned with opening 135 to facilitate the moulding of bracket 120.

An elongated projection indicated generally at 145, is formed on the outer surface 147 of each leg 121 and preferably extends throughout the length thereof and form a right angle therebetween as can be seen in FIG. 24. Projections 145 preferably have a three-sided generally rectangular configuration with a top surface 149, an outer end surface 150, and a bottom surface 151.

Figure 23:
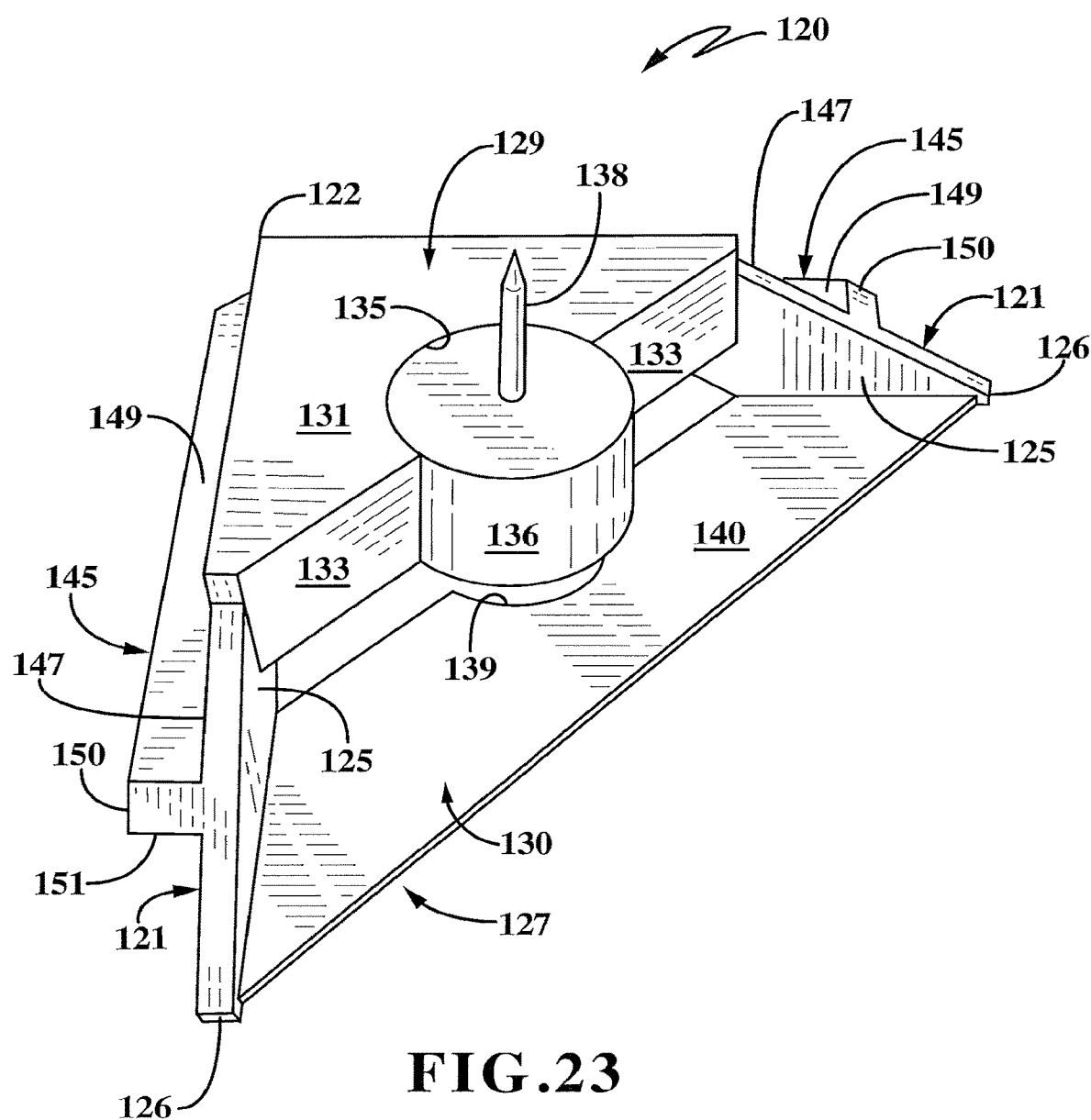
FIG. 23 is a top perspective view of a fifth embodiment of the picture hanging bracket of the present invention.
Figure 23A:
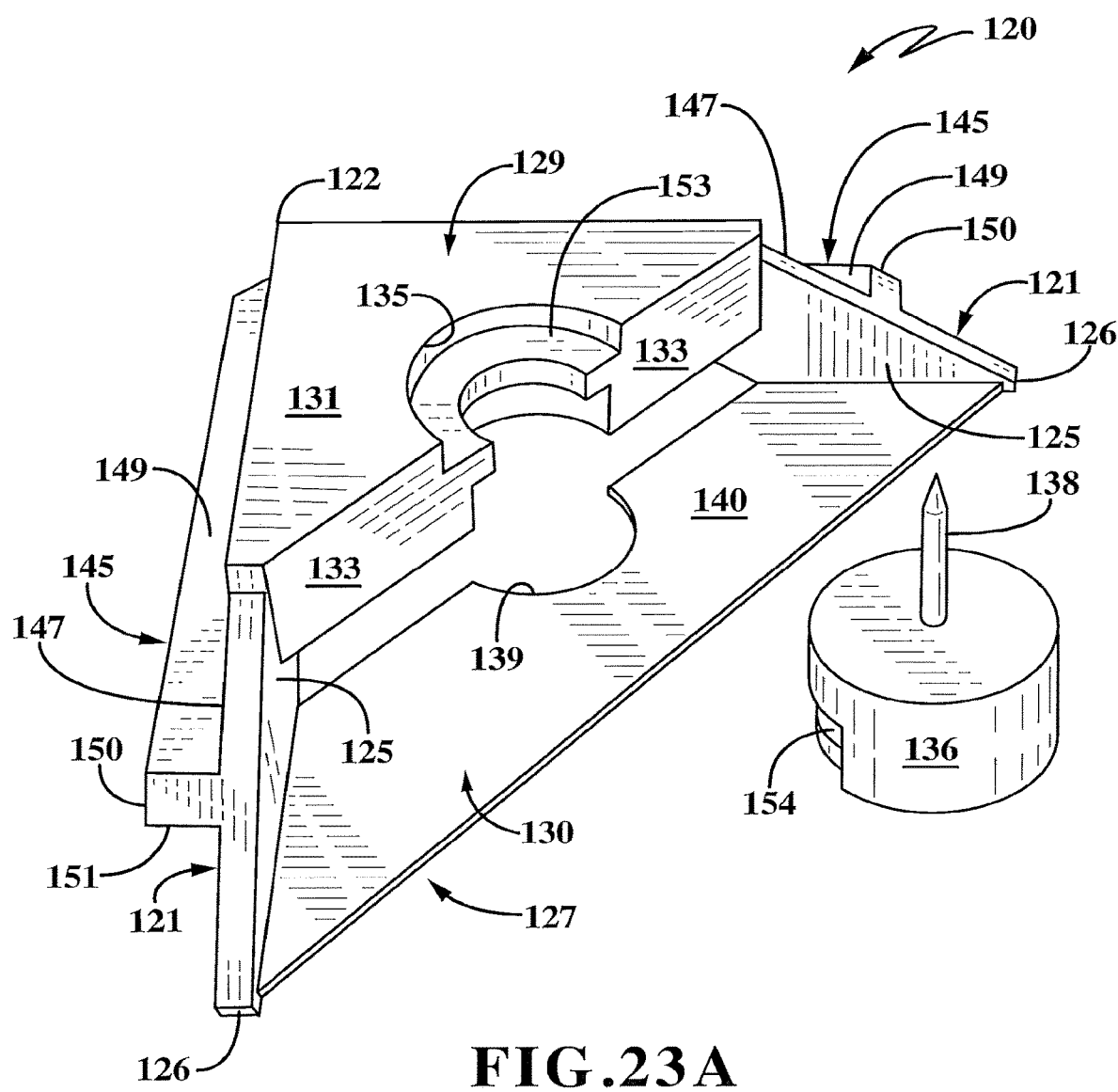
FIG. 23A is a top perspective view similar to FIG. 23 with the attachment pin removed from the bracket.

Bracket 120 preferably is formed as an integral one piece member of molded plastic with the exception of the separate cylindrical shaft 136 in which attachment pin 138 is embedded. Semicylindrical opening 135 (FIG. 23A) may have a stepped configuration as shown with a ledge or arcuate projection 153 which extends into a complementary-shaped arcuate opening 154 formed in shaft 136 for correctly positioning and aligning shaft 136 within opening 135. A pair of fingers (not shown) similar to snap fingers 77 shown in FIGS. 10 and 12 may be provided adjacent opening 135 for securing shaft 136 therein, providing a snap-fit engagement therebetween. However, as shown in FIGS. 23-26, shaft 136 may have a sufficient friction fit within opening 135 to securely retain shaft 136 therein. Either type of connection is suitable for removably mounting shaft 136 in opening 135.

Modified bracket 120 is intended for use with a picture frame 155 as shown in FIGS. 27-31, which is similar to frame 55 discussed above and shown particularly in FIGS. 4-7. However, top frame member 56A and side frame members 56B will be formed with longitudinally extending channels 157 and 158, respectively. These channels are complementary in shape and size to that of projections 145 formed on legs 121 in order to slidably receive projections 145 therein as discussed below.

Picture frame 155 preferably has a usual rectangular shape similar to picture frame 55 and includes four frame members each indicated generally at 56. Each frame member 56 preferably has a rectangular cross-sectional configuration with a front surface 57, a rear surface 58, and outer and inner side surfaces 59 and 60 respectively, and will usually be formed of wood, Although it could be of other types of materials without departing from the concept of the invention. Frame members 56 will form the four inner right angle corners 65 at the junction of top, bottom, and side frame members as discussed previously and shown in FIG. 7 and now in FIGS. 27-31. Front surfaces 57 of each frame member 56 for most picture frames will be formed with an inwardly extending ledge or lip 156 providing a support surface 156A for the various picture assembly components such as the glass, mat, artwork, and backing plate as discussed below. Likewise, channels 157 and 158 are formed in the inner side surfaces 60 of the top and two side frame members respectively, for use with brackets 120.

Picture frame 155 when used for displaying most artwork, pictures, and other display items preferably will have an outer pane of glass 160 (FIGS. 28 and 30) and a rectangular mat 161 having a rectangular cut-out 162 formed therein for displaying a sheet of material 163 having indicia thereon such as a photograph, painting, or other type of visual works to be displayed and viewed through glass 160. These various members generally have a rectangular shape complementary to and adapted to fit within the rectangular inner periphery of frame 155 and supported on ledge 156 as shown particularly in FIGS. 27-30.

Figure 29:
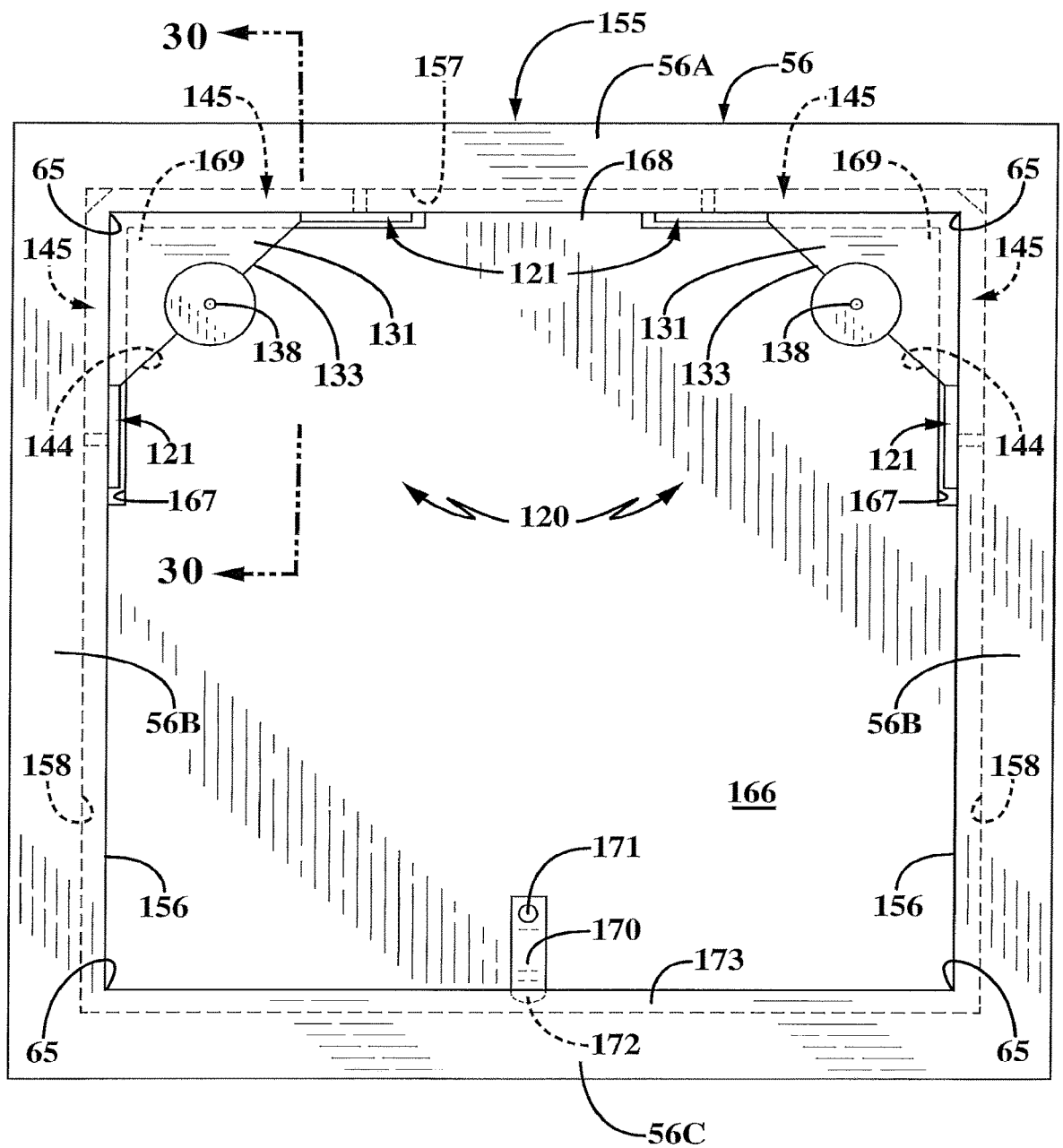
FIG. 29 is a rear plan view similar to FIG. 27 showing two of the hanging brackets installed on a picture frame.

In accordance with the main feature of bracket 120 and its method of use, a pair of brackets 120 are placed upon or adjacent to the back surface of sheet 163 and are slid in the direction of Arrows A (FIG. 27) with projections 145 sliding into channel 157 of top frame member 56A and channels 158 of side frame members 56B which preferably provide a frictional fit therebetween to retain brackets 120 therein, Although such a fit is not required in order to utilize brackets 120. A backing plate 166 which usually is formed of a rigid fiber or paper material is used in many picture frame assemblies. Backing plate 166 preferably will be provided with elongated side cutouts 167 to compensate for the thickness of legs 121, an upper tab 168 and two right angled corners 169. Corners 169 of backing plate 166 are slidably inserted through elongated passages 144 of reinforcing bodies 127 until the backing plate is in position as shown in FIG. 29. Backing plate 166 then may be secured in its seated position by the use of a pivotally mounted tab 170 which is mounted by a stud or pin 171 on backing plate 160. Tab 170 is pivoted into a secured position, preferably with its tip 172 beneath a lip 173 which is similar to lip 156 discussed above, formed on and extending from bottom frame member 56C. Pivotally mounted tab 170 is well-known in the picture-framing art and thus is not discussed in further detail. Other types of lower retaining members other than tab 170 can be used within the scope of the present invention.

Brackets 120, thus in addition to securely retaining one or more of the various picture frame members, namely glass 160, mat 161, artwork 163, and backing plate 166 securely within the frame member, also provide a mounting for cylindrical shaft 136 and attachment pin 138. Cylindrical shaft 136 which securely receives pin 138 therein is inserted and retained within cylindrical opening 135 as discussed above and shown in detail in FIGS. 10-13. Picture frame 155 is then easily positioned and secured on a support surface in the same manner as shown particularly in FIGS. 8 and 9 discussed above. Bracket 120 thus provides a mounting member for cylindrical shaft 136 and attachment pin 138 and is attached to frame 155 without requiring any addition attachment hardware as fasteners 50 discussed above for the previous embodiments.

Figure 30:
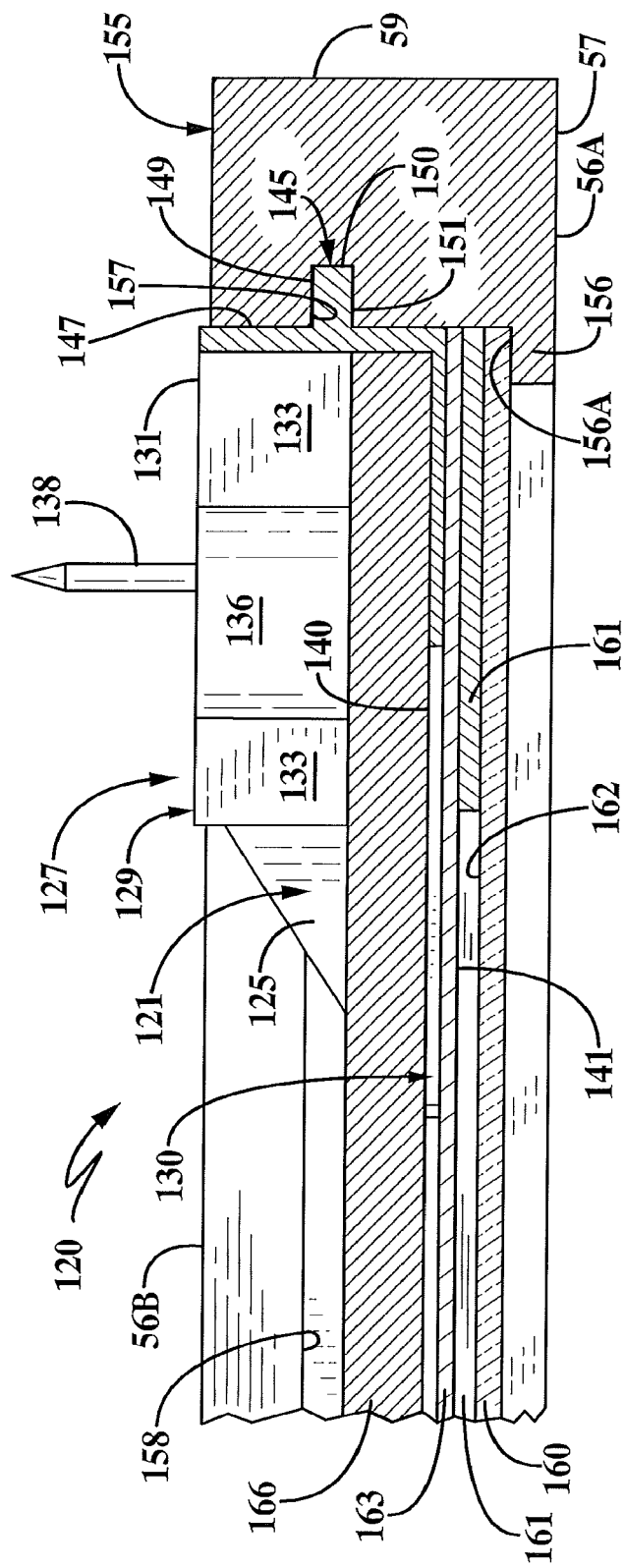
FIG. 30 is an enlarged fragmentary sectional view taken on line 30-30, FIG. 29.

Brackets 120 are used with a frame construction having the formed channels 157 and 158 discussed above and shown in FIG. 30, or in other types of picture frames merely having an overhanging ledge beneath which projections 145 can be slidably received and retained in the two right angled corners. As shown in FIG. 30, projection 145 of bracket 120 is seated in channel 157 of top frame member 56A with projection 145 of the other bracket leg being seated and received in channels 158 of the adjacent side frame member in the same manner as shown in FIG. 30.

Figure 31:
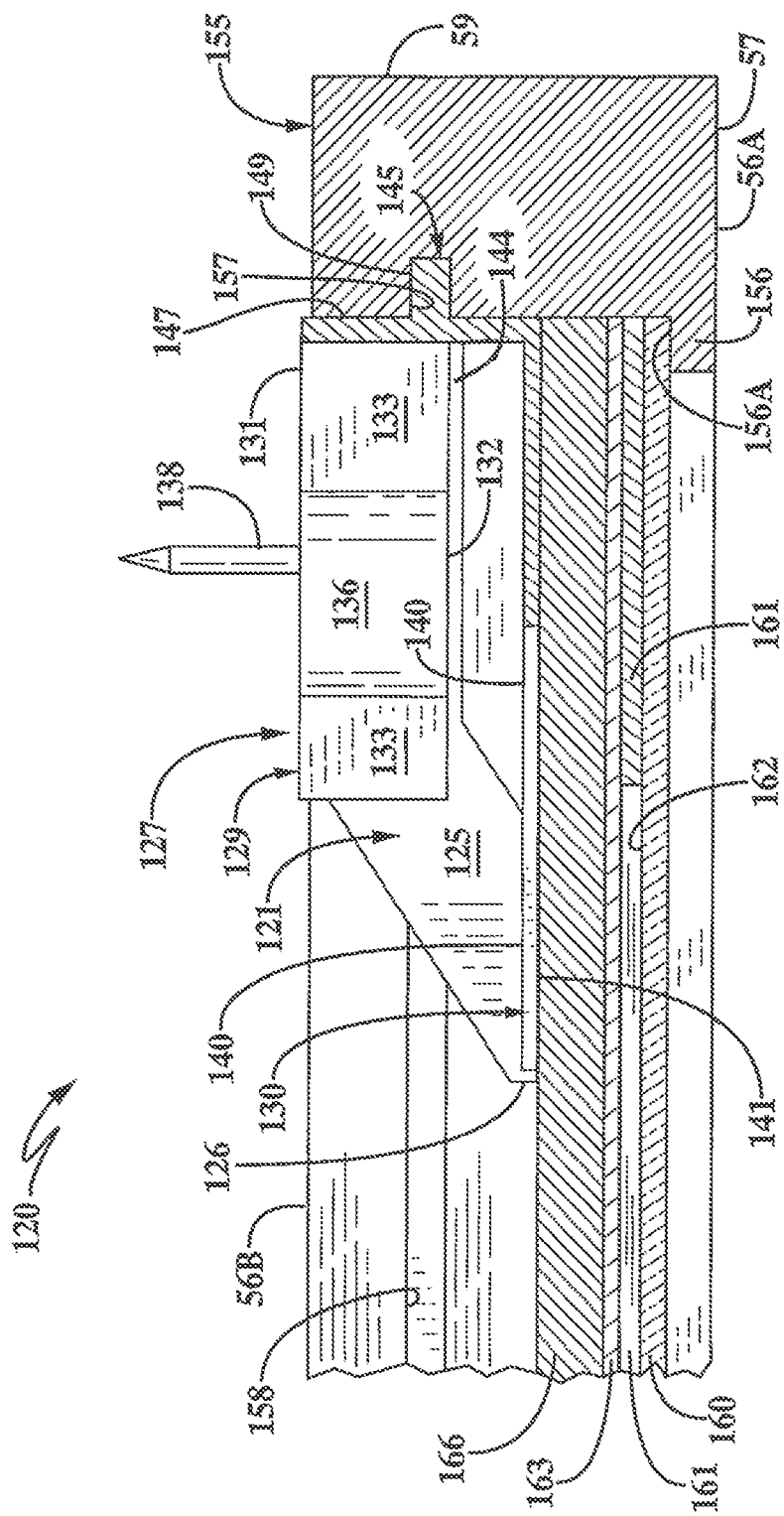
FIG. 31 is an enlarged fragmentary sectional view similar to FIG. 30, showing the hanging bracket of FIGS. 23-26 being installed on a different frame construction.

FIG. 31 shows a slightly modified form of picture construction in which brackets 120 can be slidably received within channels 175 in a frame member 176 in which backing plate 166 is in juxtaposition with artwork sheet 163. In this assembly, bracket 120 is slid along the outer or back surface 177 of backing plate 166 instead of the backing plate corners 169 being slidably received within passages 144. Again, with the embodiment of FIG. 31, brackets 120 are retained in the two right angled corners of the picture frame by engagement of projections 145 within a complementary-shaped channel formed in the inner surfaces of the frame members to securely retain one or more of the various sheet components within the interior of the frame. It is readily understood that for certain pieces of artwork, no glass or matting is provided and the artwork could be on a single sheet of material sufficiently thick to have its own stiffness, eliminating the need for any type of backing plate. Again, brackets 120 can be easily utilized for such a piece of artwork so long as the frame members have complementary-shaped channels or an overhanging ledge beneath which projections 145 can slide and be retained thereby. Likewise, the corners of backing plate 166 can slide into passages 144 of brackets 120 or entirely beneath the brackets when retaining the various picture frame components within the frame as shown in FIGS. 30 and 31.

Most importantly, brackets 120 are mounted on a picture frame free of any additional hardware, such as brads, screws, etc. and accurately placed and positioned on a support surface prior to pressing the attachment pins 138 into the support surface, again eliminating the need for additional hanging hardware attached to the support surface.

Figure 32:
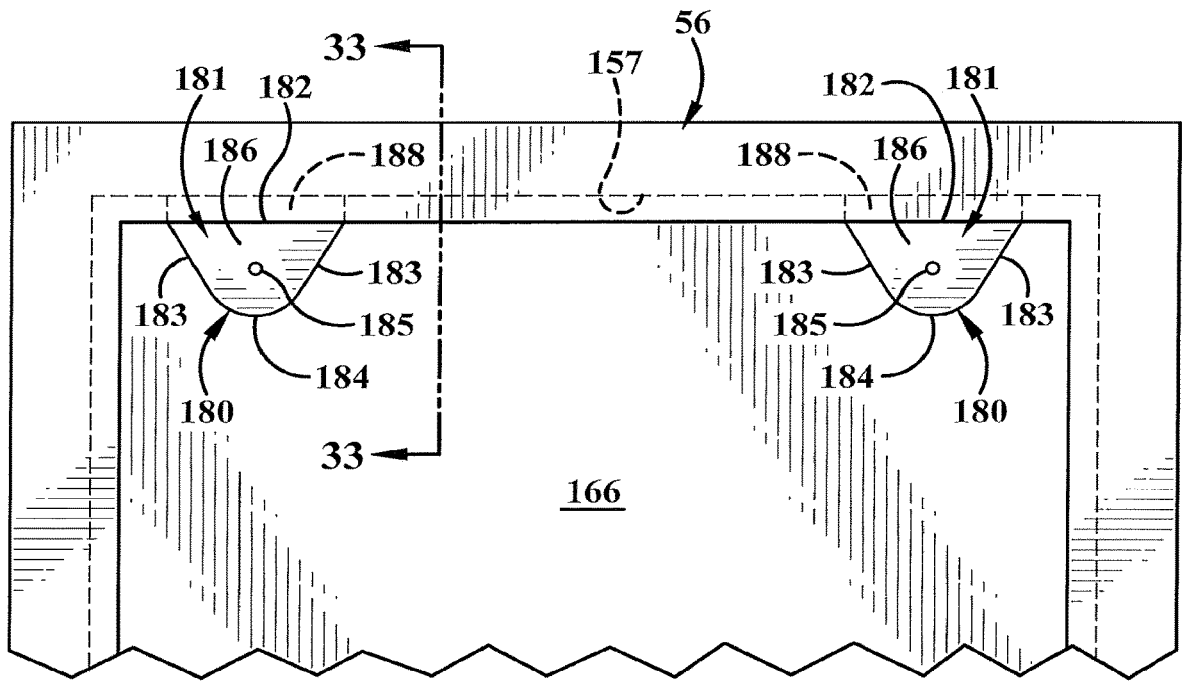
FIG. 32 is a rear plan view similar to FIGS. 27 and 29 showing two modified hanging brackets installed on a picture frame.
Figure 33:
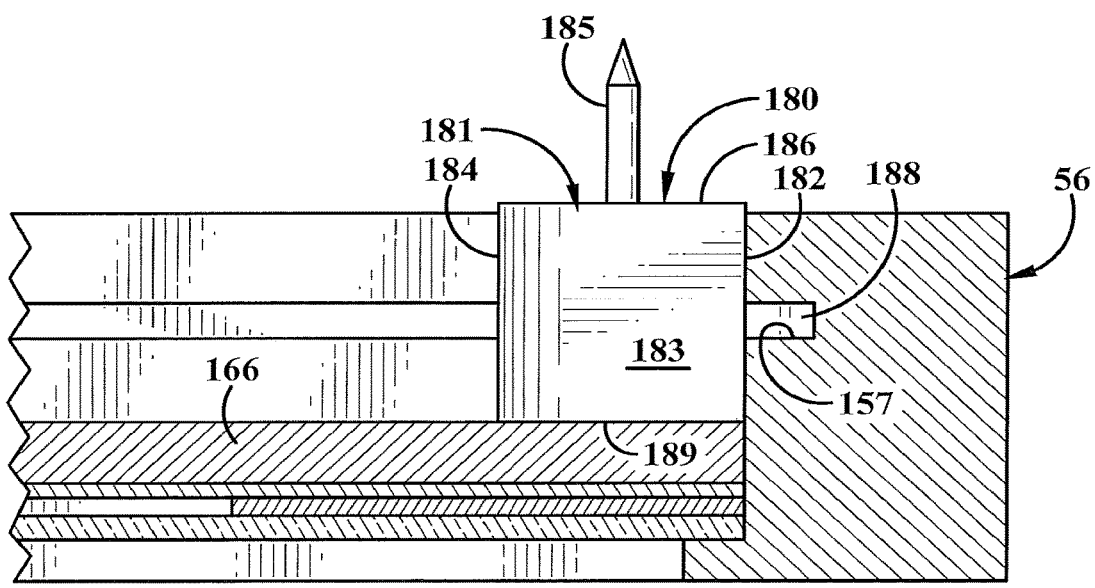
FIG. 33 is an enlarged fragmentary sectional view taken on line 33-33, FIG. 32.

A sixth embodiment of the picture hanging bracket of the present invention is indicated generally at 180, and is shown in FIGS. 32 and 33. Bracket 180 includes a body 181 preferably formed of plastic, metal or other material and may have various shapes, including a generally triangular shape as shown in FIG. 32. Body 181 has a front surface 182 and a pair of side surfaces 183 terminating in a curved rear area 184. An attachment pin 185 preferably is embedded in body 181 and extends upwardly from top surface 186 thereof. If desired, pin 185 could be removably mounted in body 181 by the various attachments shown in several of the previously described embodiments.

A projection 188 preferably is formed integrally with body 181 and extends perpendicularly outwardly from front surface 182. Projection 188 is slidably received in the longitudinally extending channel 157 formed in the top frame member 56 and is complementary in shape and size to that of channel 157 in a similar manner as discussed above with respect to modified bracket 120. Body 181 is configured so that when projection 188 is received in frame channel 157, the bottom surface 189 thereof will press slightly against the top surface of backing plate 166.

Bracket 180 enables one or more of the brackets to be easily installed in the channels formed in the frame members either top, side or bottom members for mounting the frame to a support structure without any additional mounting hardware as well as retaining the various components in the frame, such as the backing plate, glass pane, picture mat, artwork, etc.

Figure 34:
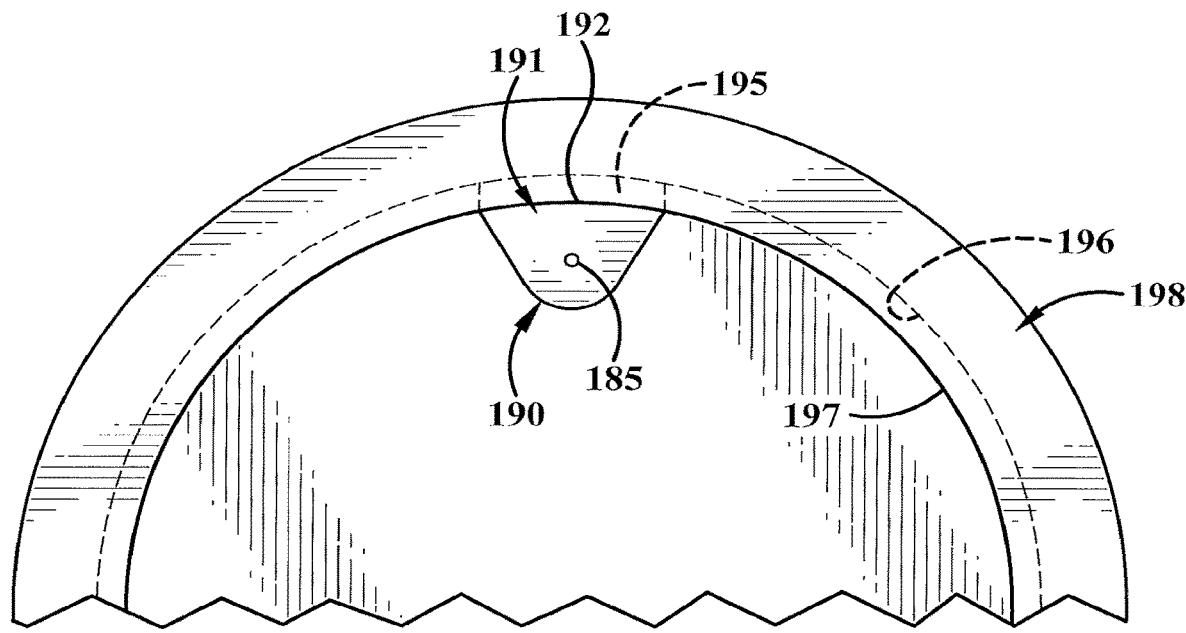
FIG. 34 is a fragmentary rear plan view showing another modified hanging bracket installed on a circular picture frame.
Figure 35:
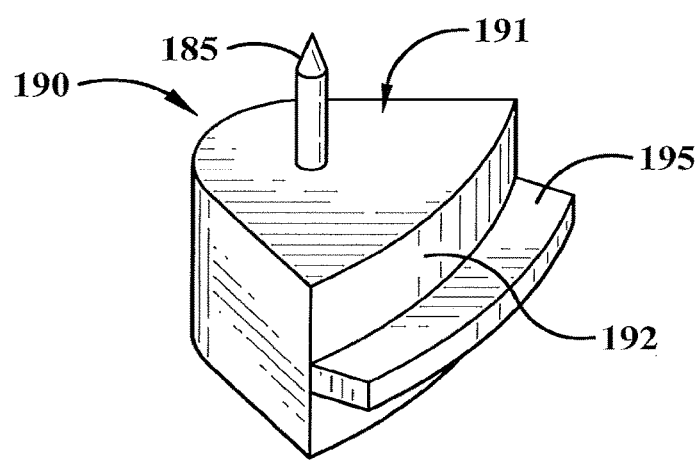
FIG. 35 is an enlarged top perspective view of the hanging bracket of FIG. 34.

Another embodiment of the hanging bracket of the present invention is indicated generally at 190, and is shown in FIGS. 34 and 35. Bracket 190 includes a main body 191 preferably formed as a one piece member of plastic, metal or other material and is similar to that of body 181 discussed above, except its end or front surface 192 has an arcuate configuration instead of the flat planar surface of surface 182 of body 181 discussed above. An arcuate projection 195 preferably is formed integrally with body 191 and extends perpendicularly outwardly from front surface 192. Surface 192 and projection 195 are convexly curved with similar arcuate length of curvature as can be seen in FIG. 35. The other features of body 191 are similar to that of body 181 discussed above having a pin 185 extending upwardly from the top surface of body 191. The main difference between body 191 and 181 is that projection 195 has an arcuate configuration as opposed to the rectangular configuration of projection 188. The arcuate configuration of end surface 192 and projection 195 facilitates the mounting of bracket 190 in a channel 196 formed in the inner surface 197 of a circular frame 198. Body 191 may also retain various components mounted within the frame, such as a backing plate, artwork, picture mat, front glass or other components to be mounted in circular frame 198.

Again, brackets 180 and 190 can be mounted on various configured frames or objects which have an inner channel formed therein complementary in shape to that of projections 188 and 195 for mounting the frame on a support structure. It is generally understood that these modified hanging brackets can be used with various types of frames and need not be a picture frame, but can be a decorative frame or other objects, such as a clock or ornamental hanging, wherein the bracket only functions to support the object on a support structure without holding any component within the frame as discussed above for many of the embodiments shown and described.

Although the frames are shown either as circular or rectangular, it is generally understood that the frame can have various and numerous configurations provided it has a channel formed on an inner surface thereof or even an inwardly extending ledge beneath which the hanging bracket projection 188 and 195 can engage for supporting the object without being slidably received within a channel, Although a channel is preferred in order to securely secure the bracket to the object and firmly secure the object to the support structure.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

What is claimed is:

1. A bracket for mounting an object on a support structure wherein said object has a channel formed in an inner surface of said object, said bracket comprising:
    a body having a first leg and a second leg that are oriented at a first angle to each other, the first and second legs defining an outer surface and a projection extending outwardly from said outer surface for engagement with the channel of said object; and
    an attachment pin mounted in the body and extending outwardly from the body at a second angle to the body and to the projection for attaching the object to the support structure,
    wherein the body is formed with an opening; wherein the attachment pin is embedded in and extends outwardly from a shaft; and wherein the shaft is retained in the opening of the body.

2. The bracket as defined in claim 1 wherein the first angle is a right angle; and wherein the projection is formed on each of the legs and extends perpendicularly outwardly therefrom.

3. The bracket as defined in claim 2 wherein the first and second legs each have a generally rectangular portion extending at the right angle with respect to each other, and a generally triangular portion extending from said generally rectangular portion.

4. The bracket as defined in claim 1 wherein the projection extends throughout the length of the first and second leg; forming the first angle at an intersection of the first and second leg.

5. The bracket as defined in claim 1 wherein the projection is slidably received in the channel of the object.

6. The bracket as defined in claim 1 wherein the projection is frictionally engaged with the channel of the object.

7. The bracket as defined in claim 1 wherein a prismatic passage is defined within the body, the passage extending between and away from the first leg and the second leg.

8. The bracket as defined in claim 7 wherein a base of the passage is triangular.

9. The bracket as defined in claim 7 wherein a backing plate of the object is received within the passage.

10. The bracket as defined in claim 1 wherein the body has a generally triangular shape.

11. A bracket for mounting an object on a support structure wherein said object has a channel formed in an inner surface of said object, said bracket comprising:
    a body having a first leg and a second leg that are oriented at a first angle to each other, the first and second legs defining an outer surface and a projection extending outwardly from said outer surface for engagement with the channel of said object; and
    an attachment pin mounted in the body and extending outwardly from the body at a second angle to the body and to the projection for attaching the object to the support structure;
    wherein the body is formed with a generally semicircular opening; wherein the attachment pin is embedded in and extends outwardly from a shaft; and wherein the shaft is removably mounted in the semicircular opening of the body.

12. A bracket for mounting an object on a support structure wherein said object has a channel formed in an inner surface of said object, said bracket comprising:
    a body having a first leg and a second leg that are oriented at a first angle to each other, the first and second legs defining an outer surface and a projection extending outwardly from said outer surface for engagement with the channel of said object; and
    an attachment pin mounted in the body and extending outwardly from the body at a second angle to the body and to the projection for attaching the object to the support structure;
    wherein the projection extends throughout the length of the first and second leg; forming the first angle at an intersection of the first and second leg.

13. A bracket for mounting an object on a support structure wherein said object has a channel formed in an inner surface of said object, said bracket comprising:
    a body having a first leg and a second leg that are oriented at a first angle to each other, the first and second legs defining an outer surface and a projection extending outwardly from said outer surface for engagement with the channel of said object; and
    an attachment pin mounted in the body and extending outwardly from the body at a second angle to the body and to the projection for attaching the object to the support structure;
    wherein the projection is slidably received in the channel of the object.

14. A bracket for mounting an object on a support structure wherein said object has a channel formed in an inner surface of said object, said bracket comprising:
    a body having a first leg and a second leg that are oriented at a first angle to each other, the first and second legs defining an outer surface and a projection extending outwardly from said outer surface for engagement with the channel of said object; and
    an attachment pin mounted in the body and extending outwardly from the body at a second angle to the body and to the projection for attaching the object to the support structure;
    wherein the projection is frictionally engaged with the channel of the object.

15. A bracket for mounting an object on a support structure wherein said object has a channel formed in an inner surface of said object, said bracket comprising:

a body having a first leg and a second leg that are oriented at a first angle to each other, the first and second legs defining an outer surface and a projection extending outwardly from said outer surface for engagement with the channel of said object; and an attachment pin mounted in the body and extending outwardly from the body at a second angle to the body and to the projection for attaching the object to the support structure;

wherein a prismatic passage is defined within the body, the passage extending between and away from the first leg and the second leg.

16. The bracket as defined in claim 15 wherein a base of the passage is triangular.

17. The bracket as defined in claim 15 wherein a backing plate of the object is received within the passage.

* * * * *